US012119586B2

(12) United States Patent
Hara et al.

(10) Patent No.: US 12,119,586 B2
(45) Date of Patent: Oct. 15, 2024

(54) CONNECTOR

(71) Applicants: AUTONETWORKS TECHNOLOGIES, LTD., Yokkaichi (JP); SUMITOMO WIRING SYSTEMS, LTD., Yokkaichi (JP); SUMITOMO ELECTRIC INDUSTRIES, LTD., Osaka (JP); TOYOTA JIDOSHA KABUSHIKI KAISHA, Toyota (JP)

(72) Inventors: Teruo Hara, Yokkaichi (JP); Masaaki Tabata, Yokkaichi (JP); Hajime Kawase, Yokkaichi (JP); Hajime Matsui, Yokkaichi (JP); Hiroki Kobayashi, Yokkaichi (JP); Kenji Makino, Yokkaichi (JP); Hiroshi Kobayashi, Okazaki (JP); Takeshi Amakawa, Toyota (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 390 days.

(21) Appl. No.: 17/617,506

(22) PCT Filed: Jun. 1, 2020

(86) PCT No.: PCT/JP2020/021653
§ 371 (c)(1),
(2) Date: Dec. 8, 2021

(87) PCT Pub. No.: WO2020/250740
PCT Pub. Date: Dec. 17, 2020

(65) Prior Publication Data

US 2022/0224044 A1 Jul. 14, 2022

(30) Foreign Application Priority Data

Jun. 12, 2019 (JP) ................................ 2019-109702
Aug. 28, 2019 (JP) ................................ 2019-155818

(51) Int. Cl.
*H01R 13/58* (2006.01)
*H01R 13/502* (2006.01)

(52) U.S. Cl.
CPC ......... *H01R 13/582* (2013.01); *H01R 13/502* (2013.01)

(58) Field of Classification Search
CPC .......................... H01R 13/582; H01R 13/502; H01R 13/5829; H01R 13/501; H01R 13/40; H01R 13/46
See application file for complete search history.

(56) References Cited

U.S. PATENT DOCUMENTS 4,413,872 A 11/1983 Rudy, Jr. et al.
4,900,277 A 2/1990 Inaba et al.

FOREIGN PATENT DOCUMENTS

JP S61-008952 U 1/1986
JP H01-105482 A 4/1989
(Continued)

OTHER PUBLICATIONS

Aug. 18, 2020 International Search Report issued in International Patent Application No. PCT/JP2020/021653.

*Primary Examiner* — Briggitte R. Hammond
(74) *Attorney, Agent, or Firm* — Oliff PLC

(57) ABSTRACT

A connector includes a terminal connected to a front end portion of an electric wire and a housing in which the terminal is arranged. The housing includes a base portion and cover members. The electric wire extending rearward from a portion of the housing that has the terminal therein is disposed on the base portion. The cover members that are movable between a position in which the cover members
(Continued)

cover the base portion and a position in which the cover members are away from the base portion. The cover members include a wire pressing portion that presses the electric wire disposed on the base portion toward the base portion when the cover members are in the position in which the cover members cover the base portion.

13 Claims, 26 Drawing Sheets

(56) References Cited

FOREIGN PATENT DOCUMENTS

| | | | |
|---|---|---|---|
| JP | 2003-331946 | A | 11/2003 |
| JP | 2005-317365 | A | 11/2005 |
| JP | 2009-054483 | A | 3/2009 |

CONNECTOR

TECHNICAL FIELD

The technology disclosed herein relates to a connector.

BACKGROUND ART

A connector cover that is mounted on a connector to cover wires has been known. The connector includes electrodes to which the wires are connected. The connector cover disclosed in Japanese Unexamined Patent Application Publication No. 2003-331946 includes a pair of connector covers having a same shape. The pair of connector covers is fitted to the connector while sandwiching the connector and covers connection portions of the wires and the electrodes. The connector covers are opposite each other when the connector covers are mounted on the connector and the connector covers hold the wires that are connected to the connector.

RELATED ART DOCUMENT

Patent Document

[Patent Document 1] Japanese Unexamined Patent Application Publication No. 2003-331946 (FIG. 7(b))

SUMMARY OF THE INVENTION

Problem to be Solved by the Invention

However, according to the above configuration, the connector necessarily requires the pair of connector covers and this increases the number of components of the connector and increases a manufacturing cost.

The technology described herein was made in view of the above circumstances. An object is to provide a connector that contributes to a reduction of a number of components.

Means for Solving the Problem

A connector according to the present disclosure includes a terminal connected to a front end portion of an electric wire and a housing in which the terminal is arranged. The housing includes a base portion and a cover member. The electric wire extending rearward from a portion of the housing that has the terminal therein is disposed on the base portion. The cover member is movable between a position in which the cover member covers the base portion and a position in which the cover member is away from the base portion. The cover member includes a wire pressing portion that presses the electric wire disposed on the base portion toward the base portion when the cover member is in the position in which the cover member covers the base portion.

Advantageous Effects of Invention

According to the technology disclosed herein, the number of components included in a connector can be reduced.

MODES FOR CARRYING OUT THE INVENTION

Figure 1:
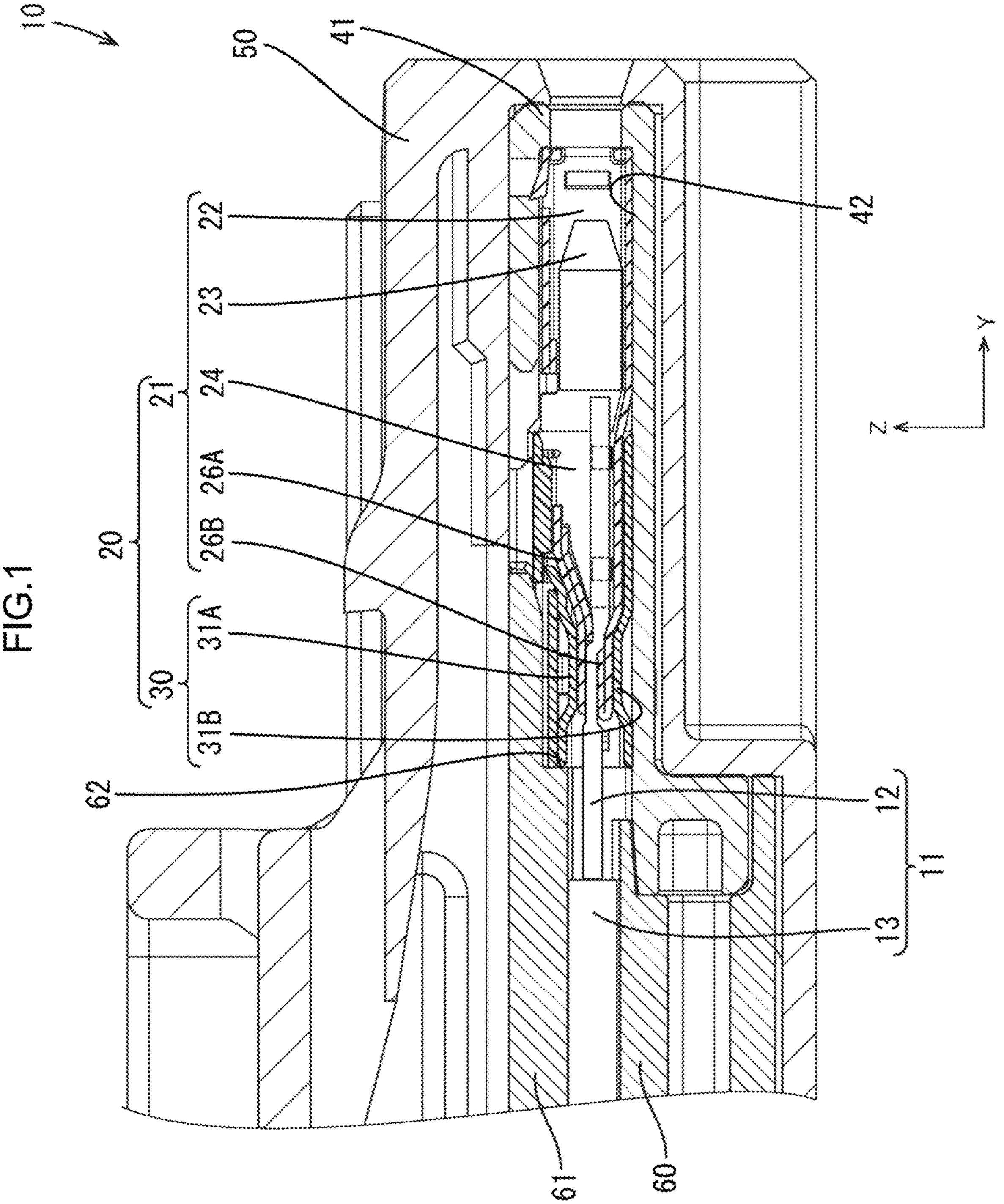
FIG. 1 is an enlarged cross-sectional view illustrating a portion of a connector according to a first embodiment.

Description of Embodiments According to the Present Disclosure

First, embodiments according to the present disclosure will be listed and described.

(1) A connector according to the present disclosure includes a terminal connected to a front end portion of an electric wire and a housing in which the terminal is arranged. The housing includes a base portion and a cover member. The electric wire extending rearward from a portion of the housing that has the terminal therein is disposed on the base portion. The cover member is movable between a position in which the cover member covers the base portion and a position in which the cover member is away from the base portion. The cover member includes a wire pressing portion that presses the electric wire disposed on the base portion toward the base portion when the cover member is in the position in which the cover member covers the base portion.

The electric wire is held between the base portion and the cover member is included in the housing. This reduces the number of components compared to a configuration including a cover that is a separate component from the housing. This also reduces manufacturing cost of the connector.

Since the electric wire is held between the base portion and the wire pressing portion, an external force that is applied to the electric wire is less likely to be transferred to the terminal.

(2) The connector may further include an outer housing in which the housing is arranged and that covers the cover member from an outer side.

Since the outer housing covers the cover member, the cover member is less likely to be opened. Therefore, the electric wire is surely held by the cover member.

(3) The cover member may include at least two cover members that are disposed to sandwich the base portion.

The electric wire is arranged to sandwich the base portion and is arranged on one surface and another surface of the base portion. In such a connector, the electric wire that is arranged on the two surfaces of the base portion can be pressed by the at least two cover members that are arranged to sandwich the base portion.

(4) One cover member of the at least two cover members may include a stopper member that projects toward other cover member of the at least two cover members sandwiching the base portion. The stopper member may be fitted to the other cover member when the cover members are in the position in which the cover members cover the base portion.

The stopper member suppresses the cover members from being opened.

(5) The connector may further include an outer housing in which the housing is arranged. One of the one cover member and the other cover member may include a rib that projects from an outer surface of the one of the one cover member and the other cover member. The outer housing may include a retainer portion that presses the rib toward another one of the one cover member and the other cover member.

When the one cover member and the other cover member are locked by the stopper member, a small gap is generally provided in a locking portion. This may cause rattling between the one cover member and the other cover member. The rattling may decrease the pressing force of the electric wire pressing portion that presses the electric wire and the holding properties of the housing that holds the electric wire may be lowered. The rib included in the one of the one cover member and the other cover member is pressed toward the other cover member by the retainer portion included in the outer housing. This suppresses the rattling between the one cover member and the other cover member and the wire holding properties of the housing can be improved.

(6) The one cover member and the other cover member may be fitted together in an upper-lower direction that crosses a direction in which the electric wire extends. The rib may be on a side portion of the one of the one cover member and the other cover member with respect to a right-left direction that crosses the direction in which the electric wire extends and the upper-lower direction.

The rib that is on the end portion with respect to the right-left direction suppress the overlapping portion of the one cover member and the other cover member from being separated from each other unlike a configuration that the rib is on the end portion with respect to the upper-lower direction.

(7) The outer housing may include a receiver portion that has an opening portion opening rearward and in which the housing is inserted through the opening portion. The retainer portion may have a recessed shape that is recessed from a rear surface of an opening edge of the opening portion. The rib may be on a rear portion of the one of the one cover member and the other cover member and is arranged in the retainer portion. An inner surface of the retainer portion may be contacted with the rib in a direction toward the other one of the one cover member and the other cover member such that the one of the one cover member and the other cover member is pressed toward the other one of the one cover member and the other cover member.

The retainer portion has a recessed shape recessed from the rear surface of the opening edge. The rib is on the rear portion of the cover member. Therefore, the rib is not pressed by the retainer portion while the housing is being inserted into the outer housing. Accordingly, the operability of inserting the housing into the outer housing can be improved compared to a configuration that the rib is on a front portion of the cover member.

(8) The connector according to claim 7, wherein the cover member may include a projection that projects from an outer surface of the cover member and is contacted with an inner surface of the receiver portion.

Since the projection is contacted with the inner surface of the receiver portion, the cover member is less likely to be curved.

(9) The housing may include a strain relief portion that holds the electric wire to be curved with respect to a direction crossing a front-rear direction. The strain relief portion may be on a rear side with respect to the wire pressing portion.

The electric wire is kept in the curved state with respect to the front-rear direction by the strain relief portion. Therefore, the external force that is applied to the electric wire is absorbed by the curved portions. Accordingly, the external force that is applied to the electric wire is surely suppressed from being transferred to the terminal.

(10) The connector may further include a holding member that is wrapped around the housing. The holding member may be wrapped around a portion of the housing that is on a rear side with respect to the wire pressing portion while the electric wire being held between the cover member and the base portion.

The holding member suppresses the cover member from being opened. Therefore, the electric wire is firmly held between the base portion and the cover member.

(11) The cover member may include an auxiliary projection in a portion thereof around which the holding member is wrapped and the auxiliary projection may project toward the electric wire.

The pressure force that is applied by the holding member is surely transferred to the electric wire via the auxiliary projection. Accordingly, the electric wire can be firmly held by the cover member.

(12) The terminal may include a holding portion that holds the electric wire and a shell that is fitted to the holding portion such that the holding portion is within the shell. The shell may include a pressing portion that presses the holding portion toward the electric wire.

The holding portion that is pressed by the pressing portion of the shell holds the electric wire. According to such a configuration, the electric wire can be electrically connected to the terminal. Therefore, a large-scale investment in equipment such as a pressing jig is not necessary and manufacturing cost can be reduced.

(13) The cover member may be pivotably moved from the position in which the cover member is away from the base portion to the position in which the cover member covers the base portion. The wire pressing portion may project from the cover member and include a contact portion having an angled shape. The contact portion may first come in contact with the electric wire when the cover member is pivoted to the position in which the cover member covers the base portion.

Since the contact portion has an angled shape, the wire pressing portion is easily pressed into the electric wire when the cover member is pivoted and moved from the position in which the cover member is away from the base portion to the position in which the base portion is covered (when the cover member is closed). This improves a holding force of holding the electric wire. Compared to a configuration including a round contact portion, the cover member is closed easily and assembling properties of the connector are improved.

(14) The wire pressing portion may include a standing surface that is a plane surface and extends from the cover member and a top surface that is a plane surface and extends from a distal end of the standing surface rearward in the extending direction in which the wire extends. The contact portion may be an angled portion between the standing surface and the top surface and an angle formed by the standing surface and the top surface may be 90 degrees or smaller.

According to such a configuration, the contact portion first comes in contact with the electric wire when the cover member is pivoted to be closed.

(15) The cover member may have a base surface that is continuous from a basal end of the wire pressing portion and the base surface may be contacted with the electric wire when the cover member covers the base portion.

Since the base surface is contacted with the electric wire, the wire pressing portion is less likely to be pressed into the electric wire excessively. This suppresses the insulating cover member of the electric wire from being torn.

DETAILED DESCRIPTION OF THE TECHNOLOGY DESCRIBED HEREIN

Embodiments of the present technology will be described. The present technology described herein is not limited to the following embodiments but may be defined by the scope of the claims and include any equivalents of the scope of the claims and any modifications within the scope of the claims.

First Embodiment

A first embodiment will be described with reference to FIGS. 1 to 5. A connector 10 in this embodiment is mounted in a vehicle such as an automobile and is to be fit to a target connector that is connected to ends of wires or a device. Hereinafter, a Z-direction corresponds to an upward direction, a Y-direction corresponds to a frontward direction, and an X-direction corresponds to a leftward direction. Regarding components having the same configuration, some of the components may be indicated by reference signs and others may not be indicated by the reference signs.

[Connector 10]

As illustrated in FIG. 1, the connector 10 includes terminals 20 that are connected to electric wires 11, a housing 41, and an outer housing 50. A rear holder 60 is disposed on a rear end side of the housing 41 and keeps positions of the terminals 20 that are arranged in the housing 41. The electric wires 11 include core wires 12 made of copper, copper alloy, aluminum, aluminum alloy, or other material and insulating cover members 13 that are made of insulating synthetic resin and surround and cover the respective core wires 12.

[Terminal 20]

As illustrated in FIG. 1, the terminal 20 includes a terminal body portion 21 and a shell 30 that is fitted to the terminal body portion 21 from an outer side. The terminal body portion 21 is a female terminal made of metal such as copper, copper alloy, aluminum, aluminum alloy, or other materials. The terminal body portion 21 includes a tubular portion 22 that has a square tubular shape and a wire connection portion 24 that is continuous rearward from the tubular portion 22 and connected to the electric wire 11. The terminal body portion 21 further includes an elastic contact piece 23 that is arranged in the tubular portion 22 and the elastic contact piece 23 is to be connected to a target male terminal. The terminal body portion 21 further includes an upper holding portion 26A and a lower holding portion 26B on a rear end side of the wire connection portion 24. The upper and lower holding portions 26A, 26B extend rearward and sandwich the core wire 12.

The upper holding portion 26A and the lower holding portion 26B have a form of rectangular plate, and extend rearward from rear end portions of an upper wall and a rear wall of the wire connection portion 24, respectively.

[Shell 30]

The shell 30 is made of metal such as copper, copper alloy, aluminum, aluminum alloy, or other materials or made of hard synthetic resin and is formed in a square tubular shape that can receive the wire connection portion 24, the upper holding portion 26A, and the lower holding portion 26B therein. The shell 30 includes an upper pressing portion 31A and a lower pressing portion 31B in a rear portion thereof and the pressing portions 31A, 31B are for pressing the pair of holding portions 26A, 26B. The upper pressing portion 31A and the lower pressing portion 31B are portions of an upper wall and a lower wall of the shell 30 that project inwardly. The upper pressing portion 31A and the lower pressing 31B are formed to extend in an area corresponding to a length of the upper holding portion 26A and the lower holding portion 26B with respect to the front-rear direction such that a distance between the upper wall and the lower wall becomes smaller in the area.

[Housing 41]

Figure 2:
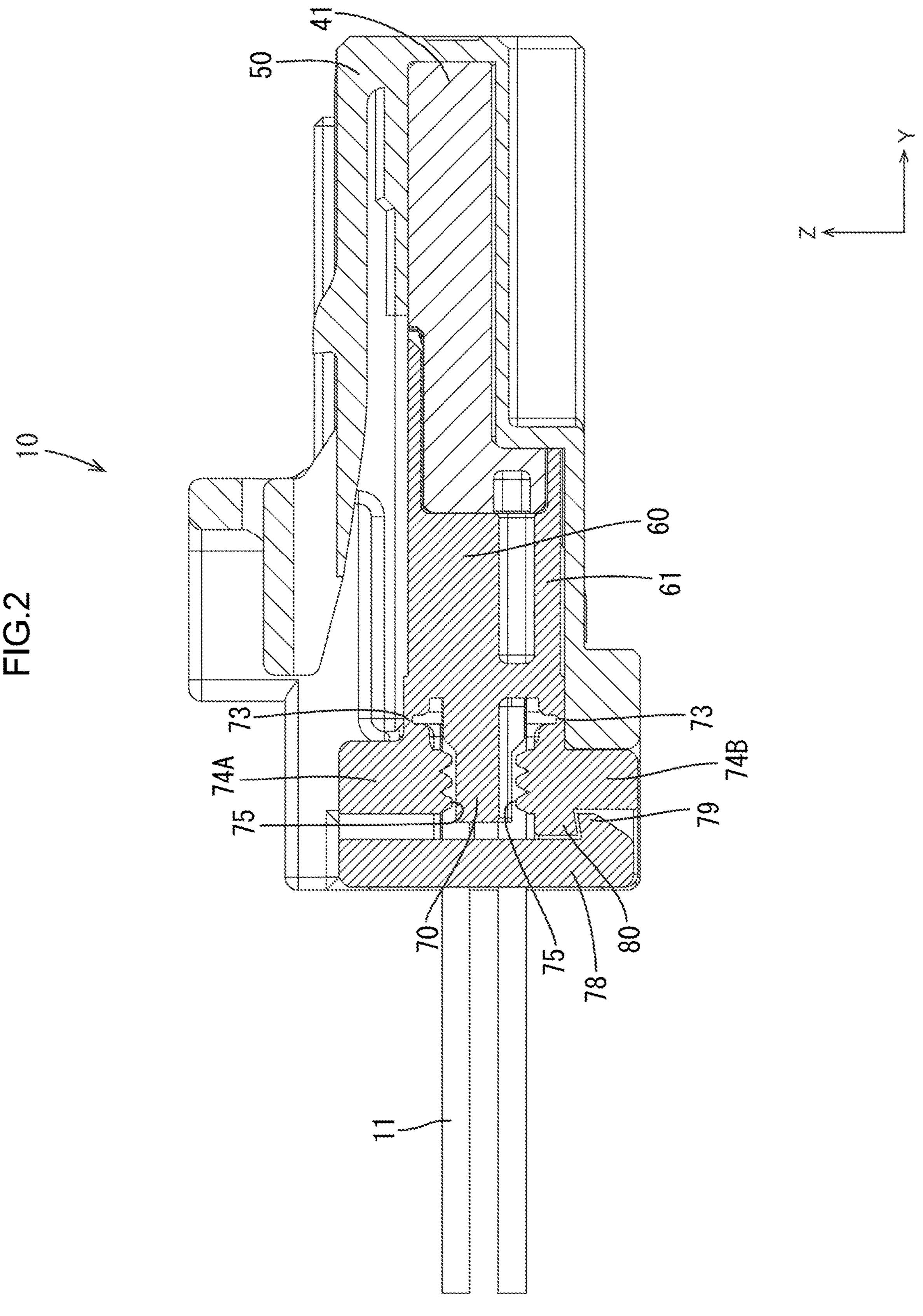
FIG. 2 is a cross-sectional view illustrating the connector.

As illustrated in FIG. 2, the connector 10 includes the housing 41 in which the terminals 20 are arranged and that is made of insulating synthetic resin and the outer housing 50 that is fitted to the housing 41 and made of insulating synthetic resin. The housing 41 has a flat rectangular parallelepiped shape and includes cavities 42 that are arranged in an upper-lower direction and a right-left direction. The cavities 42 on an upper level and those on a lower level are arranged in a zig-zag form. With respect to the right-left direction, the cavities 42 on the lower level are arranged such that a middle (a center axis) of the cavities 42 on the lower level with respect to the right-left direction is at a middle between the adjacent cavities 42 on the upper level.

Figure 3:
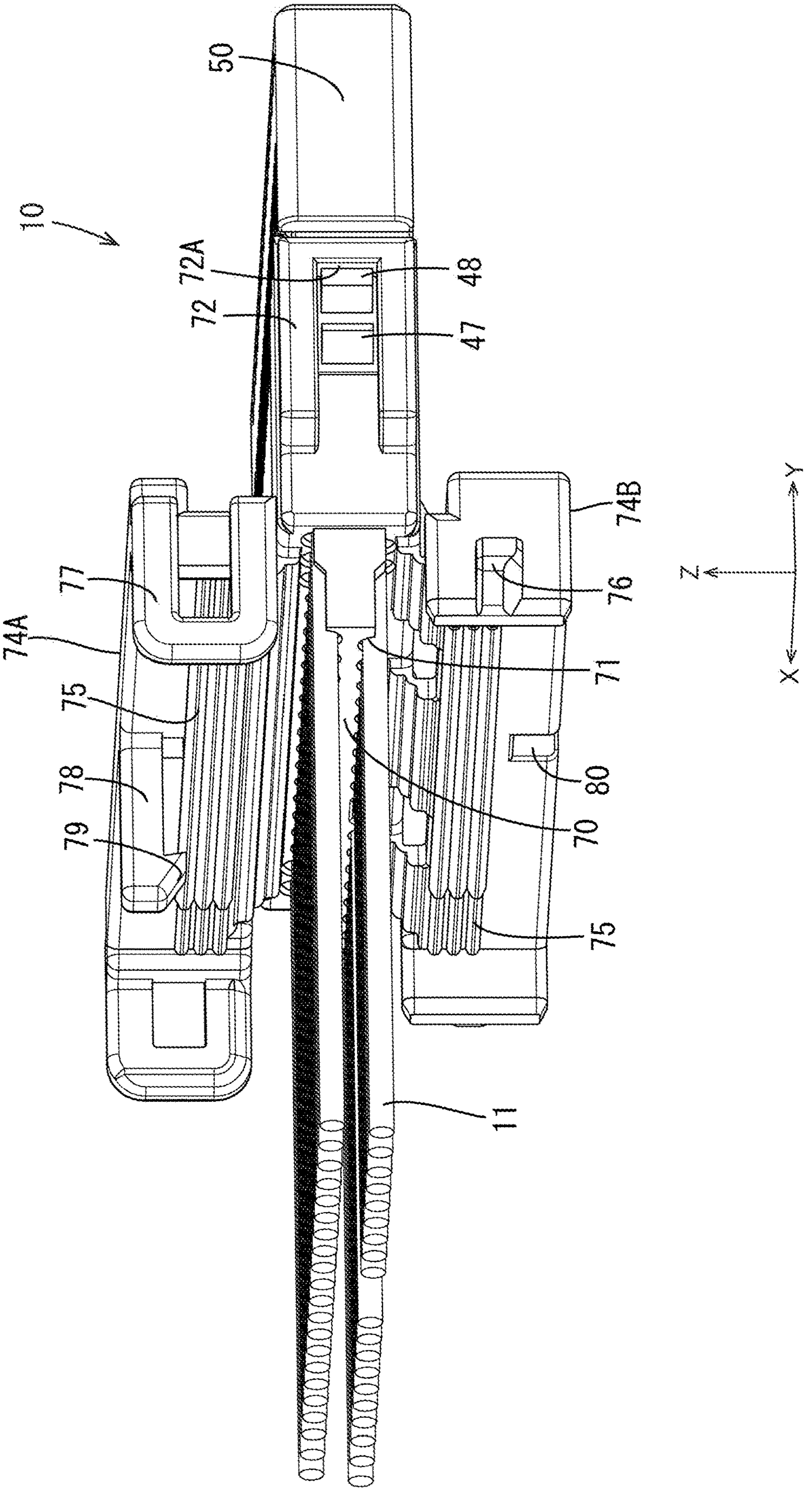
FIG. 3 is a perspective view illustrating an upper cover member and a lower cover member that are opened.

As illustrated in FIG. 3, the housing 41 includes a stopper 48 and a provisional stopper 47 on each of two side walls of the housing 41. The provisional stopper 47 and the stopper 48 are arranged in the front-rear direction on an outer surface of a rear portion of each side wall. Each of the provisional stopper 47 and the stopper 48 has a front portion of a step form and a rear portion that has a sloped surface that is inclined such that a projection dimension is decreased as it extends rearward.

As illustrated in FIG. 2, the outer housing 50 has a square box shape opening on a rear side and having a closed front portion. The housing 41 is fitted in the outer housing from the rear side. The outer housing 50 includes a locking member (not illustrated) on the inner surface thereof and the locking member is locked on an outer surface of the housing 41 to keep the fitting of the housing 41 and the outer housing 50.

[Rear holder 60]

The rear holder 60 is made of insulating synthetic resin and, as illustrated in FIG. 2, includes a body member 61, an upper cover member 74A, and a lower cover member 74B. The body member 61 has a flat rectangular parallelepiped shape. The upper cover member 74A and the lower cover member 74B are connected to a rear portion of the body member 61 via hinges 73 so as to be pivoted around the hinges 73, respectively. The hinges 73 are formed in a thin belt-like shape and can be deformed to be warped. The upper cover member 74A and the lower cover member 74B are movable between two positions including a first position in which the upper cover member 74A and the lower cover member 74B cover an upper surface and a lower surface of a base portion 70, respectively, and a second position in which the upper cover member 74A and the lower cover member 74B are away from the base portion 70. The upper cover member 74A and the lower cover member 74B are pivotable around the hinges 73, respectively. As illustrated in FIG. 3, the body member 61 includes two fitting frames 72 in two side portions thereof, respectively, and the fitting frames 72 extend frontward.

As illustrated in FIG. 1, the rear holder 60 includes a terminal stopper portion 62 that projects inward from an upper wall of the rear holder 60. The rear end portion of the shell is contacted with the terminal stopper portion 62 and the terminal is held in the cavity 42 of the housing so as not to come out from the cavity 42 toward the rear side.

Figure 4:
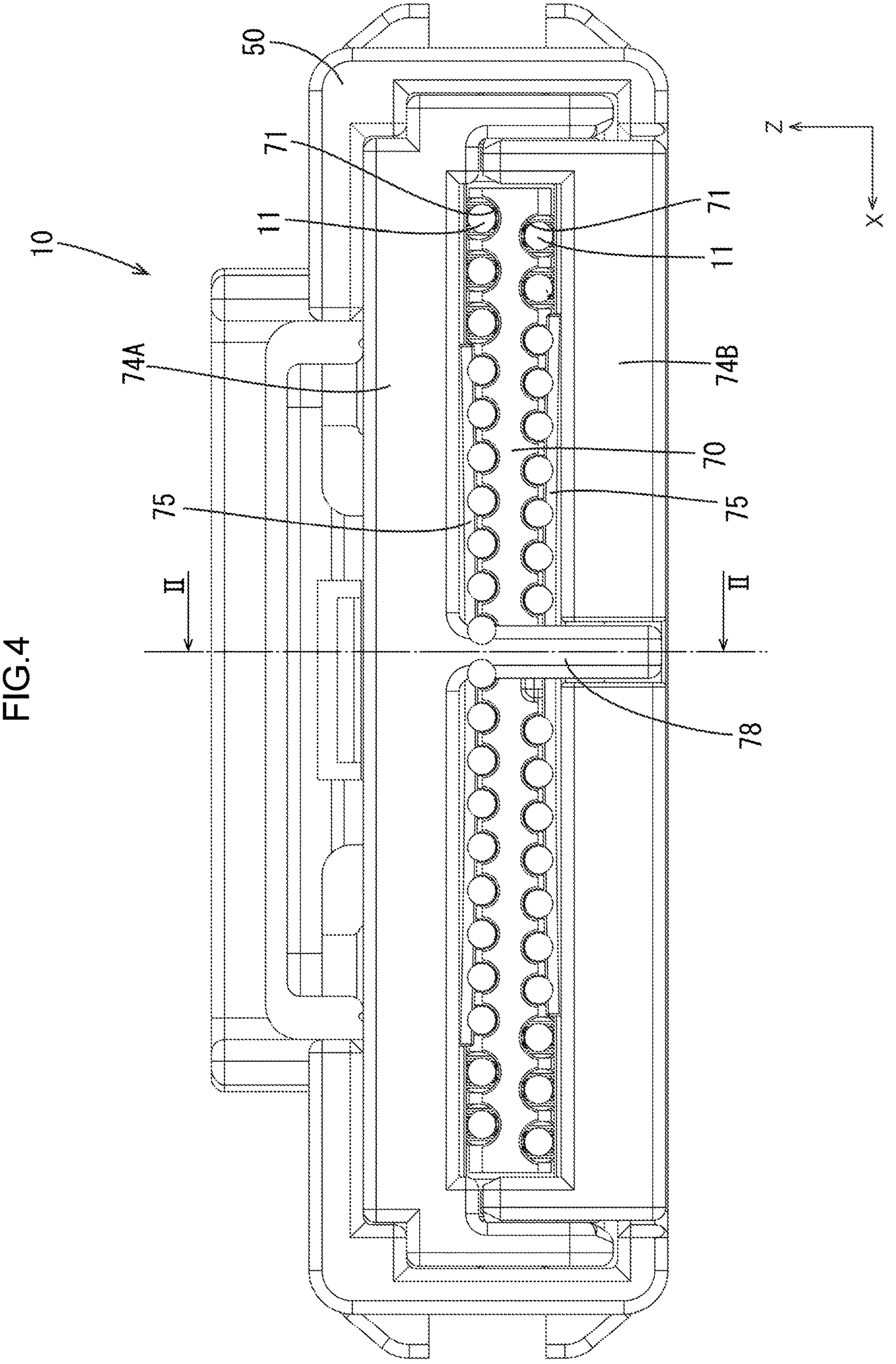
FIG. 4 is a rear view illustrating the connector.

As illustrated in FIG. 2, the body member 61 includes the base portion 70 in a rear portion thereof and the electric wires 11 are disposed on both surfaces of the base portion 70. The electric wires 11 extend rearward from the cavities 42 that receive the terminals 20 therein and the extended electric wires 11 are arranged on the base portion 70. As illustrated in FIG. 4, the base portion 70 includes wire routing grooves 71 on upper and lower surfaces thereof. The wire routing grooves 71 are arranged in the right-left direction to form a wave shape in the right-left direction while following outer peripheral surfaces of the electric wires 11.

As illustrated in FIG. 3, the fitting frames 72 can be deformed to be warped with respect to the right-left direction and include rectangular fitting holes 72A therethrough, respectively. The provisional stopper 47 or the stopper 48 is stopped by a hole edge of the fitting hole 72A.

As illustrated in FIG. 2, each of the upper cover member 74A and the lower cover member 74B includes wire pressing portions 75 that project toward the electric wires 11. The wire pressing portions 75 are for pressing the electric wires 11 that are disposed in the wire routing grooves 71 on the both surfaces of the base portion 70. The wire pressing portion 75 projects to be formed in a tapered shape and extends in an entire width of the cover member in the right-left direction.

As illustrated in FIG. 3, the lower cover member 74B includes cover locking portions 76 that project outward from side walls of the lower cover member 74B, respectively. The upper cover member 74A includes cover locking receivers 77 corresponding to the respective cover locking portions 76. The cover locking receiver 77 has a frame shape and is elastically deformable. The cover locking portions 76 and the cover locking receivers 77 are elastically fitted to each other such that the upper cover member 74A and the lower cover member 74B are maintained in a closed state.

As illustrated in FIGS. 3 and 4, the upper cover member 74A includes a stopper member 78 in a rear end portion thereof and the stopper member 78 projects from a middle portion of the upper cover member 74A with respect to the right-left direction. The stopper member 78 projects from the upper cover member 74A toward the lower cover member 74B when the upper cover member 74A and the lower cover member 74B cover the base portion 70. The stopper member 78 is a plate ember that is elastically deformed. The stopper member 78 includes a stopper projection 79 at a distal end thereof. The middle portion with respect to the right-left direction includes the middle portion with respect to the right-left direction and also includes a substantially middle portion with respect to the right-left direction that may not be an exact middle portion.

As illustrated in FIG. 2, the lower cover member 74B includes a stopper receiver 80 corresponding to the stopper member 78 and the stopper projection 79 is fitted to the stopper receiver 80. When the upper cover member 74A and the lower cover member 74B are in the position in which the cover members cover the base portion 70, the stopper member 78 are elastically fitted to the stopper receiver 80 in the respective middle portions of the upper cover member 74A and the lower cover member 74B with respect to the right-left direction. This suppresses the upper cover member 74A and the lower cover member 74B from being opened in the upper-lower direction in the middle portion thereof.

Figure 5:
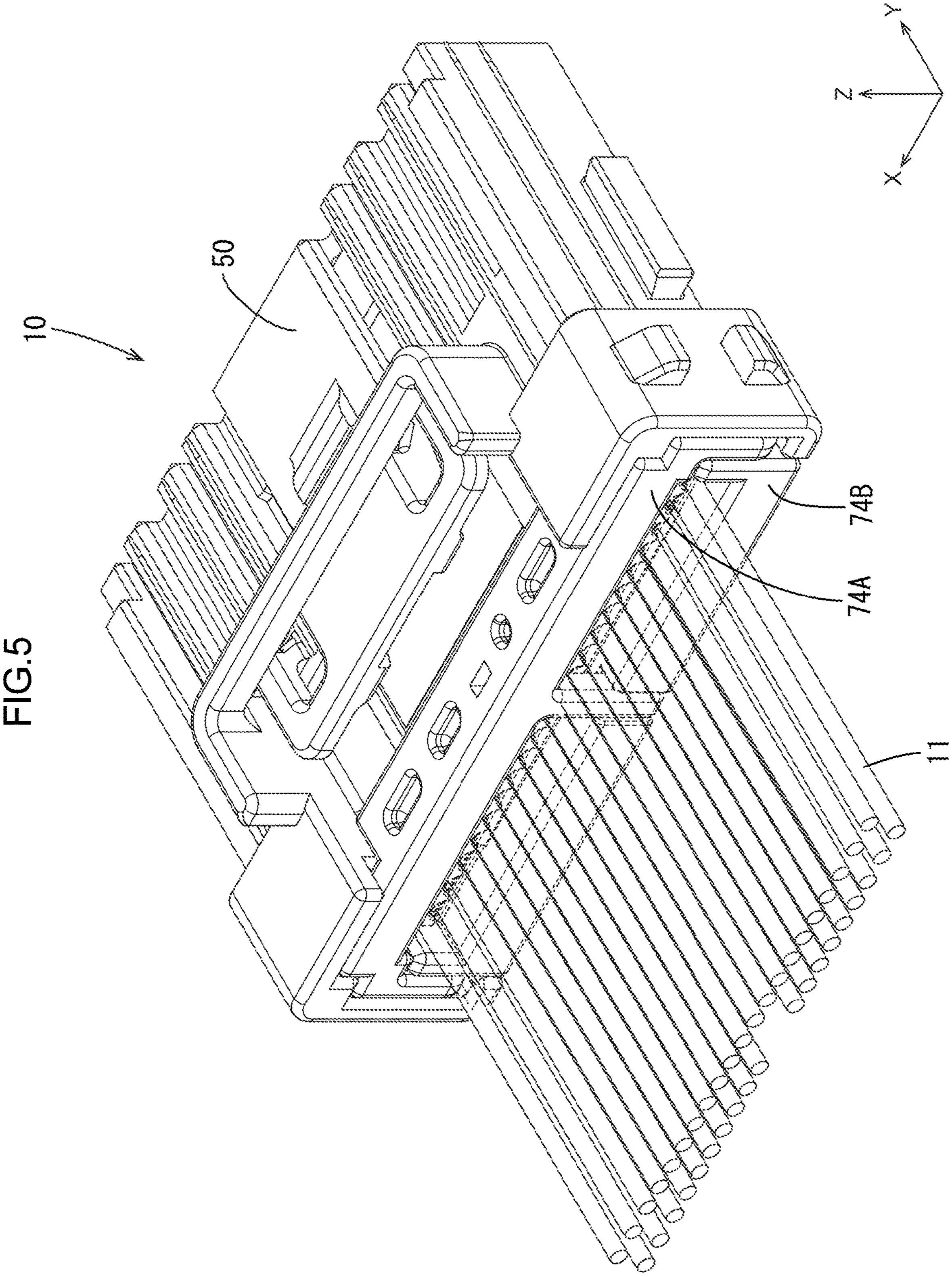
FIG. 5 is a perspective view illustrating the connector.

As illustrated in FIG. 5, when the housing 41 is fitted in the outer housing 50, the outer housing 50 covers outer peripheries of the upper cover member 74A and the lower cover member 74B.

[One Example of a Process of Producing Connector 10]

A process of producing the connector 10 will be described. The process of producing the connector 10 is not limited to the one described below.

The shell 30 is fitted to the rear end portion of the terminal body portion 21 of the terminal 20 and the terminal 20 is set in the cavity 42 of the housing 41. The rear holder 60 is provisionally fitted to the housing 41 by fitting the fitting frames 72 of the rear holder 60 to the provisional stoppers 47 of the housing 41.

Next, the insulating cover members 13 are removed from the end portions of the electric wires 11 such that the core wires 12 are exposed therefrom and the electric wires 11 including exposed core wires 12 are inserted into the rear holder 60 from the rear side. The electric wires 11 are inserted through a space between the upper pressing portion 31A and the lower pressing portion 31B and into a space between the upper holding portion 26A and the lower holding portion 26B. Next, the shell 30 is moved frontward with sliding with respect to the terminal body portion 21. Accordingly, as illustrated in FIG. 1, the upper holding portion 26A is pressed and deformed by the upper pressing portion 31A and the lower holding portion 26B is pressed and deformed by the lower pressing portion 31B. Thus, the upper holding portion 26A and the lower holding portion 26B hold the core wire 12 of the electric wire 11.

Next, the rear holder 60 is moved frontward with respect to the housing 41. Then, the fitting between the provisional stopper 47 and the rear holder 60 is released and the fitting frames 72 come in contact with the stoppers 48 and are deformed and warped by the stoppers 48. Accordingly, the fitting frames 72 are fitted to the stoppers 48 and become in a fitting state.

Next, the upper cover member 74A is pivoted downward and the lower cover member 74B is pivoted upward. The cover locking portions 76 and the cover locking receivers 77 are fitted to each other and the stopper member 78 and the stopper receiver 80 are fitted to each other. Then, the outer housing 50 is mounted on the housing 41 from the front side and the connector 10 is obtained.

[Operations and Advantageous Effects of the Present Embodiment]

According to this embodiment, following operations and advantageous effects are obtained. The connector 10 of this embodiment includes the terminals 20 that are connected to the front end portions of the electric wires 11, respectively, and the housing 41 in which the terminals 20 are arranged. The housing 41 is equipped with the base portion 70, the upper cover member 74A, and the lower cover member 74B. The electric wires 11 extend rearward from the portion where the terminals 20 are arranged and extended electric wires 11 are disposed on the base portion 70. The upper cover member 74A and the lower cover member 74B are movable between a position where the cover members 74A, 74B cover the base portion 70 and a position where the cover members 74A, 74B are away from the base portion 70. The upper cover member 74A and the lower cover member 74B include the wire pressing portions 75. The wire pressing portions 75 press the electric wires 11, which are disposed on the base portion 70, toward the base portion 70 when the cover members 74A, 74B are in the position where the cover members 74A, 74B cover the base portion 70.

The electric wires 11 are held between the base portion 70 and each of the upper cover member 74A and the lower cover member 74B that are included in the housing 41. This reduces the number of components compared to a configuration including a cover that is a separate component from the housing 41. This also reduces manufacturing cost of the connector 10.

Since the electric wires 11 are held between the base portion 70 and the wire pressing portions 75, an external force that is applied to the electric wires 11 is less likely to be transferred to the terminals 20.

According to this embodiment, the housing 41 is fitted in the outer housing 50 and the outer housing 50 covers the upper cover member 74A and the lower cover member 74B from an outer side.

Since the outer housing 50 covers the upper cover member 74A and the lower cover member 74B, the upper cover member 74A and the lower cover member 74B are less likely to be opened. Therefore, the electric wires 11 are surely held by the cover member.

According to this embodiment, the base portion 70 is between the upper cover member 74A and the lower cover member 74B in the housing 41.

The electric wires 11 are arranged to sandwich the base portion 70 and are arranged on an upper surface and a lower surface of the base portion 70. In such a connector 10, the electric wires 11 that are arranged on the two surfaces of the base portion 70 can be pressed by the upper cover member 74A and the lower cover member 74B that are arranged to sandwich the base portion 70.

According to this embodiment, the upper cover member 74A includes the stopper member 78. The stopper member projects toward the lower cover member 74B that is disposed to sandwich the base portion 70 with the upper cover member 74A. The stopper member 78 is fitted to the lower cover member 74B when the cover members cover the base portion 70.

The stopper member 78 suppresses the cover members from being opened.

According to this embodiment, the stopper member is in the middle portion of the upper cover member with respect to the right-left direction (a direction crossing a direction in which the electric wires 11 extend).

The stopper member 78 is in the middle portion of the cover member with respect to the direction crossing the direction in which the electric wires 11 extend. This further suppresses the upper cover member 74A and the lower cover member 74B from being opened.

According to this embodiment, the terminal 20 includes the upper holding portion 26A and the lower holding portion 26B that hold the electric wire 11 and the shell 30 that is fitted to the upper holding portion 26A and the lower holding portion 26B from the outer side. The shell 30 includes the upper pressing portion 31A and the lower pressing portion 31B that press the upper holding portion 26A and the lower holding portion 26B toward the electric wire 11.

The upper holding portion 26A and the lower holding portion 26B that are pressed by the upper pressing portion 31A and the lower pressing portion 31B of the shell hold the electric wire 11. According to such a configuration, the electric wires 11 can be electrically connected to the terminals 20. Therefore, a large-scale investment in equipment such as a pressing jig is not necessary and manufacturing cost can be reduced.

Second Embodiment

Figure 6:
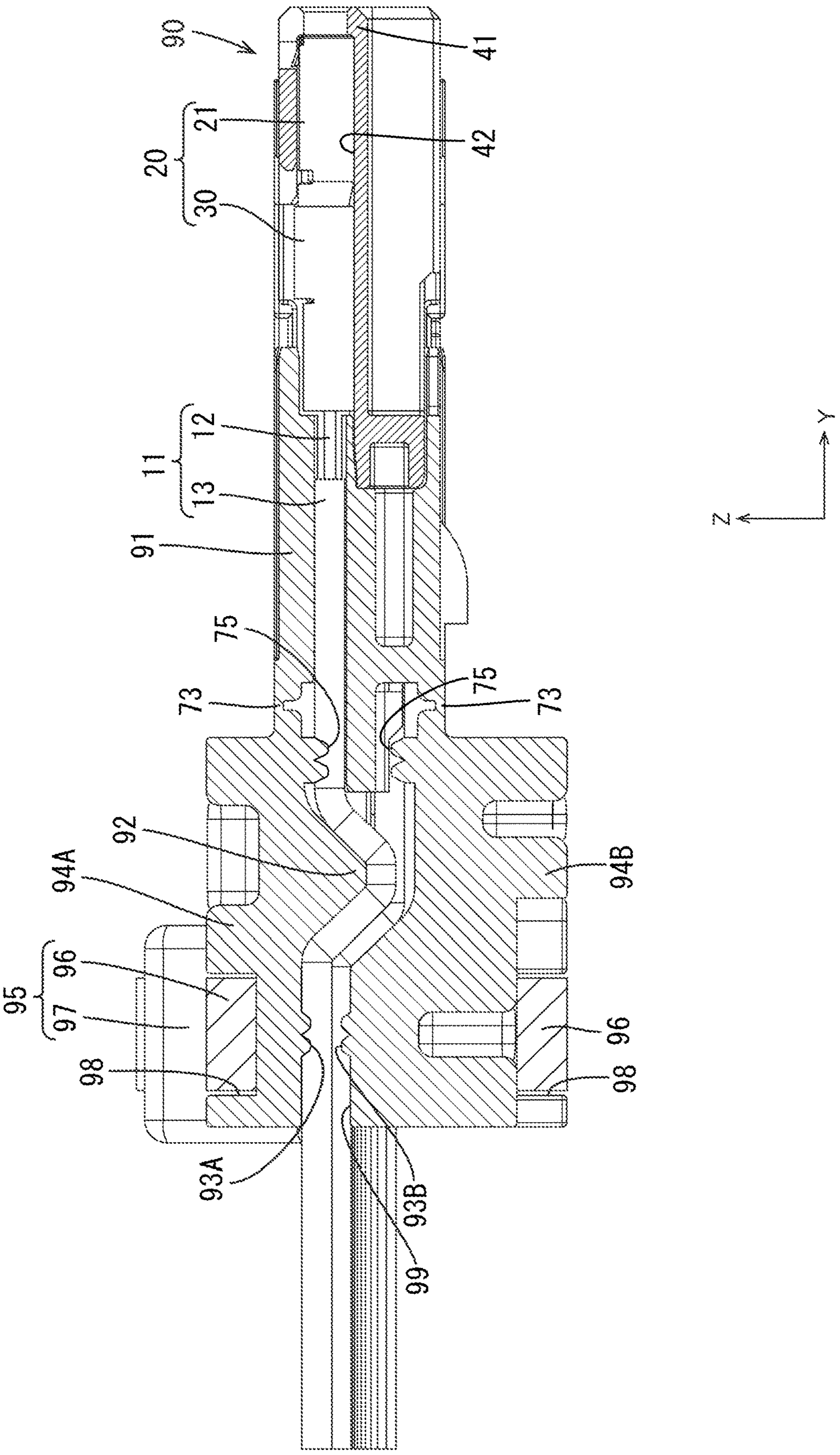
FIG. 6 is a cross-sectional view illustrating a connector according to a second embodiment.

Next, a connector 90 according to a second embodiment of the present disclosure will be described with reference to FIGS. 6 to 8. As illustrated in FIG. 6, a rear holder 91 includes a strain relief portion 92 on a rear side with respect to the wire pressing portions 75. The strain relief portion 92 projects downward from the upper wall of the rear holder 91. The strain relief portion 92 includes a front surface and a rear surface that are relatively gentle sloped surfaces. The electric wires 11 extend in the front-rear direction and are curved and recessed downward along the sloped surfaces of the strain relief portion 92. The strain relief portion 92 projects from the upper wall of the rear holder 91 by a projecting dimension that is greater than a diameter of the electric wire 11.

As illustrated in FIG. 6, the rear holder 91 includes upper auxiliary projections 93A and lower auxiliary projections 93B on a rear side with respect to the strain relief portion 92. The upper auxiliary projections 93A and the lower auxiliary projections 93B project toward the electric wires 11. The upper cover member 94A includes the upper auxiliary projections 93A and the lower cover member 94B includes the lower auxiliary projections 93B. The upper auxiliary projections 93A are opposite the lower auxiliary projections 93B, respectively, when the upper cover member 94A and the lower cover member 94B are closed. The upper auxiliary projections 93A and the lower auxiliary projections 93B extend in the right-left direction. Two rows of the upper auxiliary projections 93A are arranged in the front-rear direction and two rows of the lower auxiliary projections 93B are arranged in the front-rear direction. The electric wires 11 are held between the upper auxiliary projections 93A and the lower auxiliary projections 93B when the upper cover member 94A and the lower cover member 94B are closed.

Figure 7:
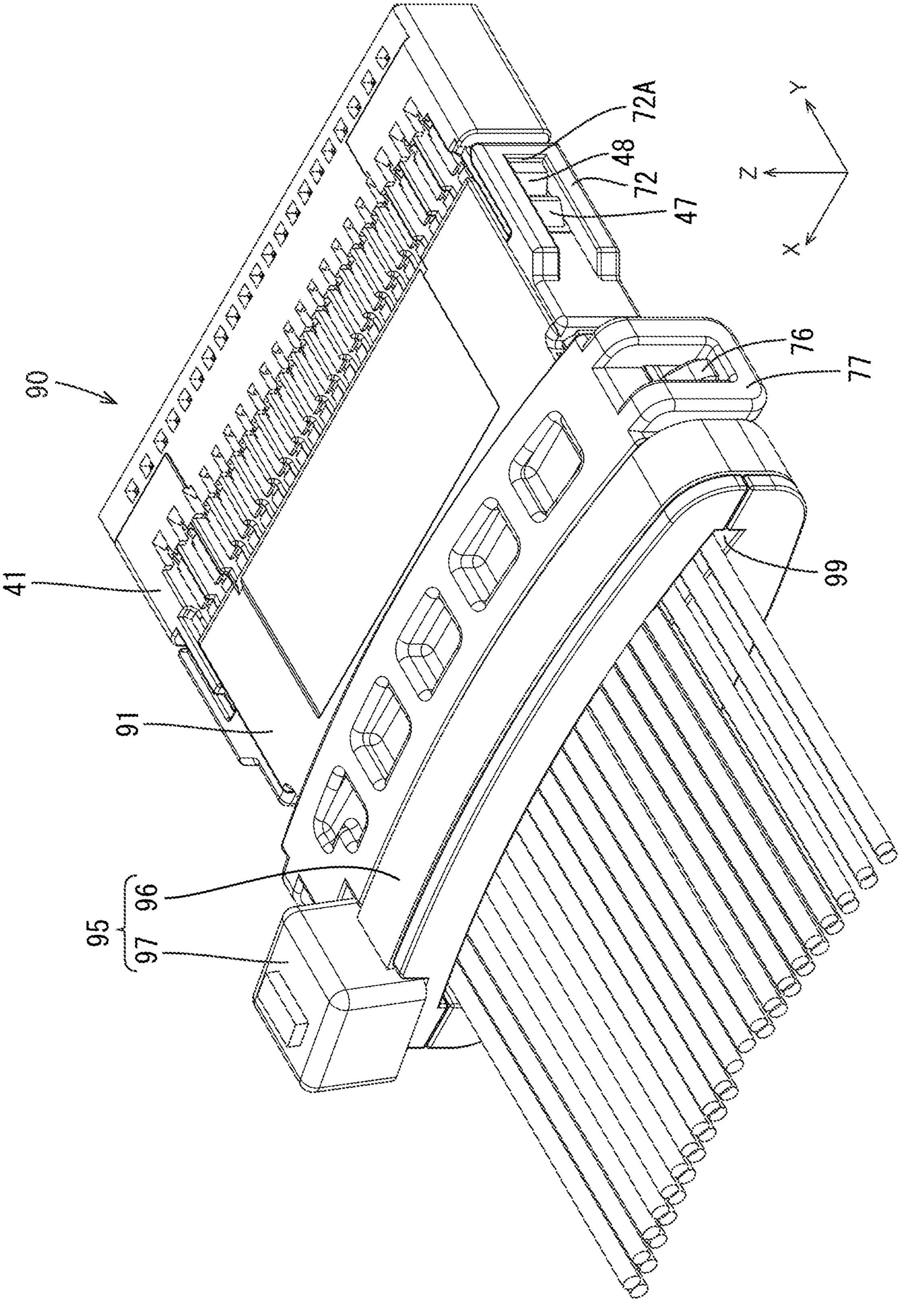
FIG. 7 is a perspective view illustrating the connector.

As illustrated in FIG. 7, a holding member 95 is wrapped around the upper cover member 94A and the lower cover member 94B when the upper cover member 94A and the lower cover member 94B are closed. The upper cover member 94A and the lower cover member 94B are pressed toward the electric wires 11 by the holding member 95. The holding member 95 includes a band member 96 having a belt-like shape and a stopper 97. The stopper 97 fixes end portions of the band member 96 so as not to be free. The holding member 95 may be made of synthetic resin or may be made of metal. The holding member 95 may have a known configuration.

As illustrated in FIG. 6, the upper cover member 94A and the lower cover member 94B include grooves 98, respectively, in which the holding member 95 is fitted in. The grooves 98 have a width that extends in the front-rear direction and the width is equal to or slightly greater than the width of the holding member 95 with respect to the front-rear direction. The upper auxiliary projections 93A and the lower auxiliary projections 93B are formed corresponding to the grooves 98. Namely, the upper auxiliary projections 93A are below the groove 98 of the upper cover member 94A and the lower auxiliary projections 93B are above the groove 98 of the lower cover member 94B. According to such a configuration, the force that is applied toward the wires by the holding member 95 is directly transferred to the upper auxiliary projections 93A and the lower auxiliary projections 93B.

Figure 8:
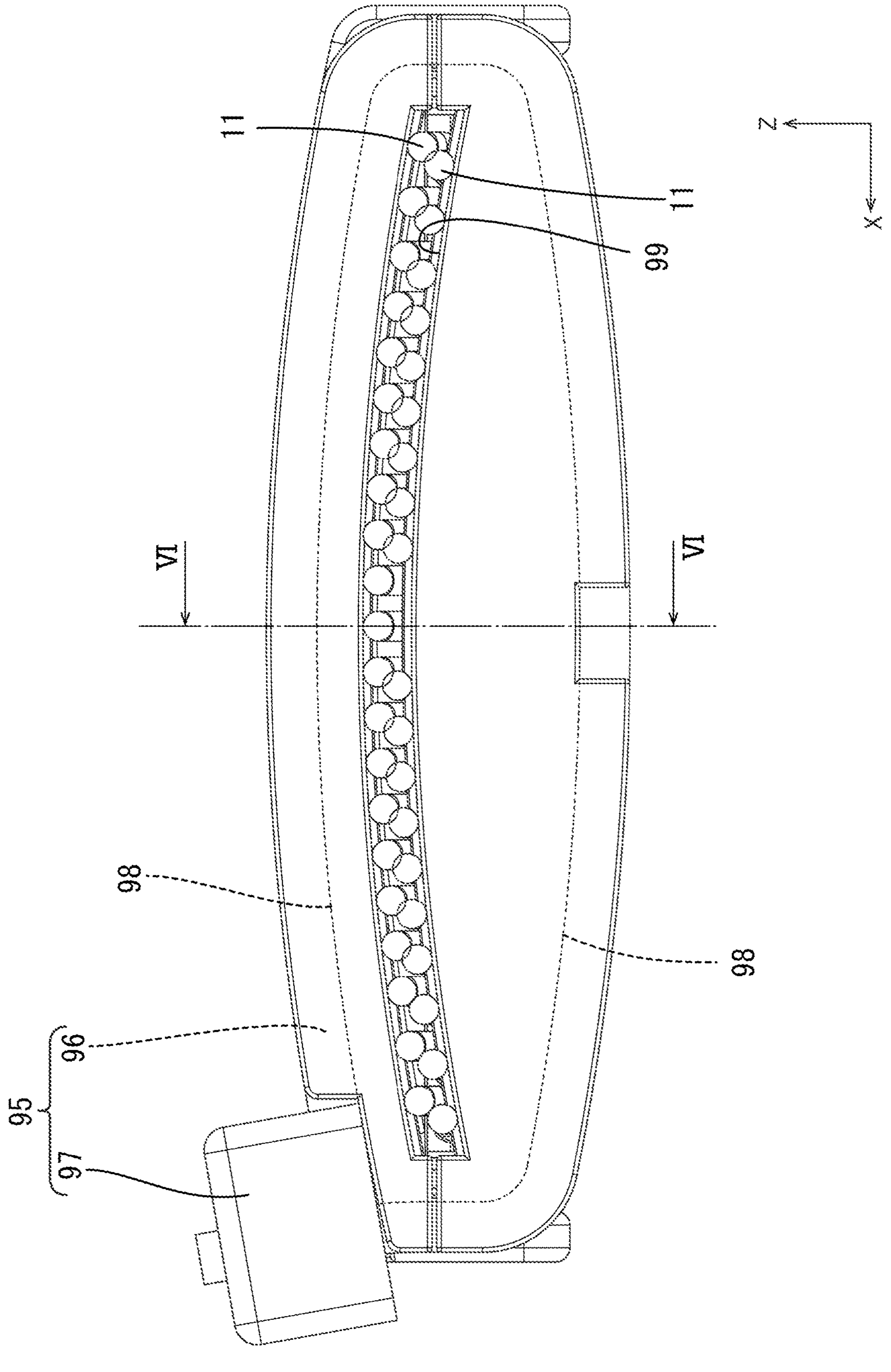
FIG. 8 is a rear view illustrating the connector.

As illustrated in FIG. 8, the grooves 98 are curved to slightly project in the upper-lower direction seen from the rear side. According to such a configuration, the holding member 95 is less likely to be lifted up in the middle portions of the upper cover member 94A and the lower cover member 94B with respect to the right-left direction. Accordingly, the force that is applied toward the electric wires 11 by the holding member 95 is surely transferred to the electric wires 11.

As illustrated in FIG. 8, the rear holder 91 includes a wire outlet 99 through which the electric wires 11 extends outside. The wire outlet 99 is a thin elongated hole that extends in the right-left direction and is curved to project upward seen from the rear side.

[Operations and Advantageous Effects of the Present Embodiment]

Next, operations and advantageous effects of this embodiment will be described. According to this embodiment, the rear holder 91 includes the strain relief portion 92 on a rear side with respect to the wire pressing portions 75. The strain relief portion 92 keeps the electric wires 11 in a curved state with respect to the front-rear direction.

The electric wire 11 is kept in the curved state with respect to the front-rear direction by the strain relief portion 92. Therefore, the external force that is applied to the electric wires 11 is absorbed by the curved portions. Accordingly, the external force that is applied to the electric wires 11 is surely suppressed from being transferred to the terminals 20.

Configurations other than the above-described ones are similar to those of the first embodiment. The components same as those of the first embodiment are indicated by the reference signs of the first embodiment and will not be described.

According to this embodiment, the holding member 95 is wrapped around the housing 41 and the holding member 95 is put around a portion of the housing 41 that is on a rear side with respect to the wire pressing portion 75 while the electric wires 11 being held between the upper cover member 74A and the lower cover member 74B.

The holding member 95 suppresses the upper cover member 74A and the lower cover member 74B from being opened. Therefore, the electric wires 11 are firmly held between the base portion 70 and each of the upper cover member 74A and the lower cover member 74B.

According to this embodiment, the upper cover member 94A and the lower cover member 94B include the upper auxiliary projections 93A and the lower auxiliary projections 93B, respectively, in the portions of the cover members that are wrapped by the holding member 95. The upper auxiliary projections 93A and the lower auxiliary projections 93B project toward the electric wires 11.

The pressure force that is applied by the holding member 95 is surely transferred to the electric wires 11 via the upper auxiliary projections 93A and the lower auxiliary projections 93B. Accordingly, the electric wires 11 can be firmly held by the upper cover member 74A and the lower cover member 74B.

Third Embodiment

Figure 9:
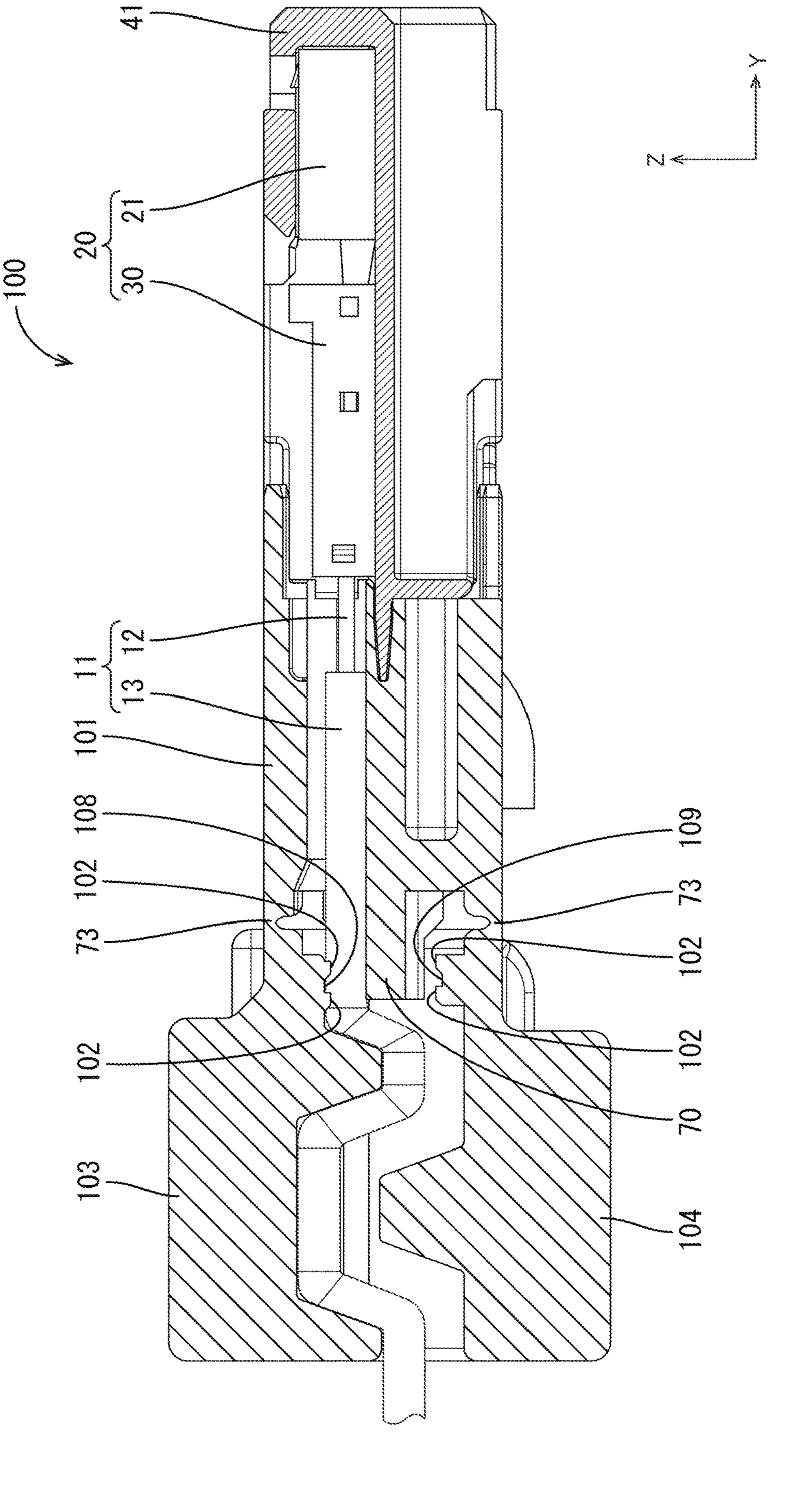
FIG. 9 is a cross-sectional view illustrating a connector according to a third embodiment.

Next, a third embodiment of the present disclosure will be described with reference to FIGS. 9 to 15. As illustrated in FIG. 9, a rear holder 101 of a connector 100 of this embodiment includes wire pressing portions 102. Rows (two rows in this embodiment) of the pressing portions 102 are arranged at an interval in the front-rear direction. The wire pressing portions 102 project downward from a lower surface 108 (one example of a base surface) of an upper cover member 103 of the rear holder 101 and the wire pressing portions 102 project upward from an upper surface 109 (one example of the base surface) of a lower cover member 104 of the rear holder 101.

Figure 10:
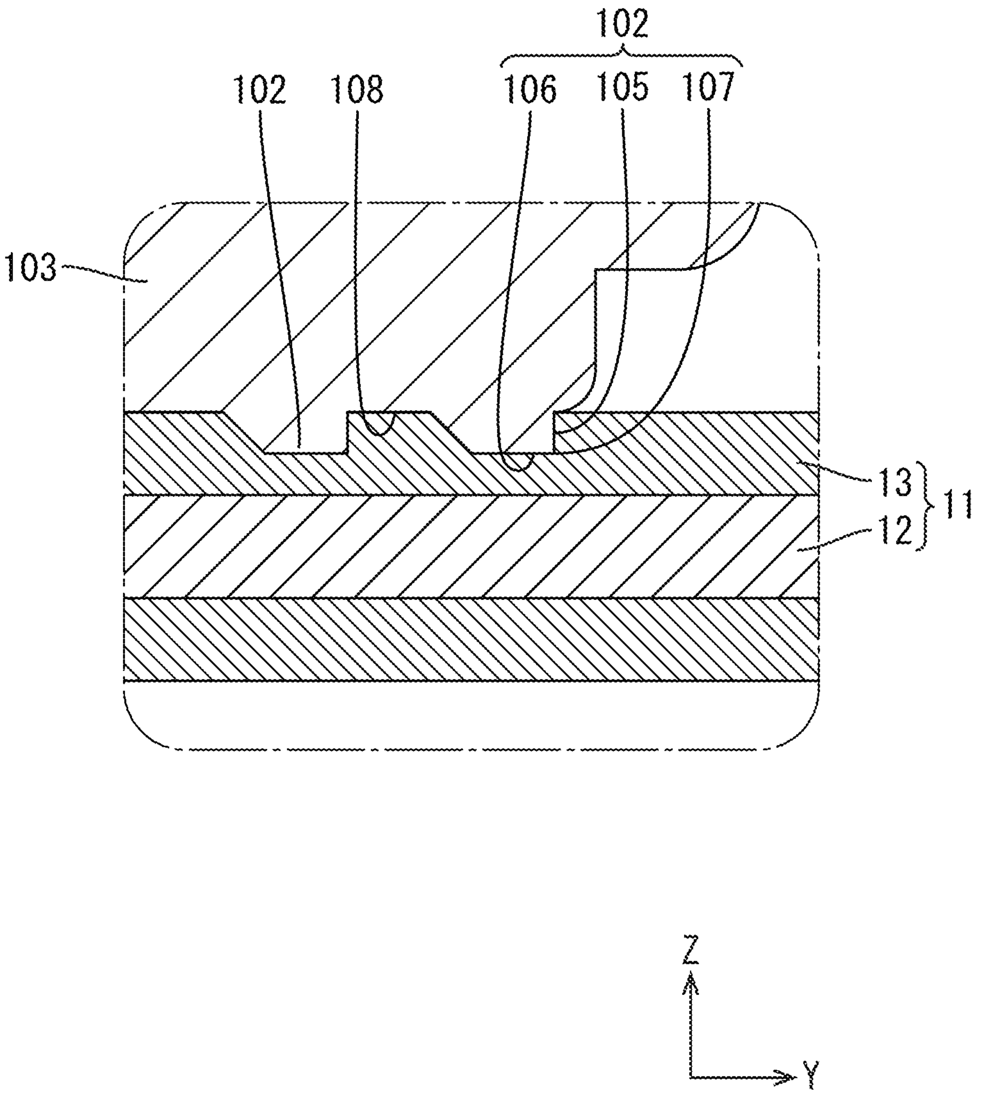
FIG. 10 is an enlarged cross-sectional view illustrating a portion of a wire pressing portion that presses the wire.

As illustrated in FIG. 10, the wire pressing portion 102 has a standing surface 105 that extends from the lower surface 108 of the upper cover member 103 and the wire pressing portion 102 has the standing surface 105 that extends from the upper surface 109 of the lower cover member 104. The standing surfaces 105 extends in a direction crossing the front-rear direction when the upper cover member 103 and the lower cover member 104 are closed.

The wire pressing portion 102 has a top surface 106 that extends rearward from an extended end of the standing surface 105 when the upper cover member 103 and the lower cover member 104 are closed.

The wire pressing portion 102 includes a contact portion 107 at a border between the standing surface 105 and the top surface 106. The contact portion 107 has an angled shape. The contact portion 107 extends in the right-left direction. The contact portion 107 first comes in contact with the electric wire 11 among the portions of the wire pressing portion 102 when the upper cover member 103 and the lower cover member 104 are pivoted around the hinges 73, which are rotation axes, to be closed to cover the base portion 70.

The angle that is formed by the standing surface 105 and the top surface 106 is not particularly limited but may be 90 degrees or smaller. In this embodiment, the angle is substantially 90 degrees. The angle that is substantially degrees includes 90 degrees but may not be exactly 90 degrees and may be any angles ranging from 85 degrees to 95 degrees, inclusive.

In this embodiment, the rear portion of the wire pressing portion 102 has a surface that is sloped from the top surface 106 toward the lower surface of the upper cover member 103 or the upper surface of the lower cover member 104 as the surface extends rearward. The wire pressing portion 102 has a tapered side-view shape toward the top surface 106 from the upper cover member 103 or the lower cover member 104.

Figure 11:
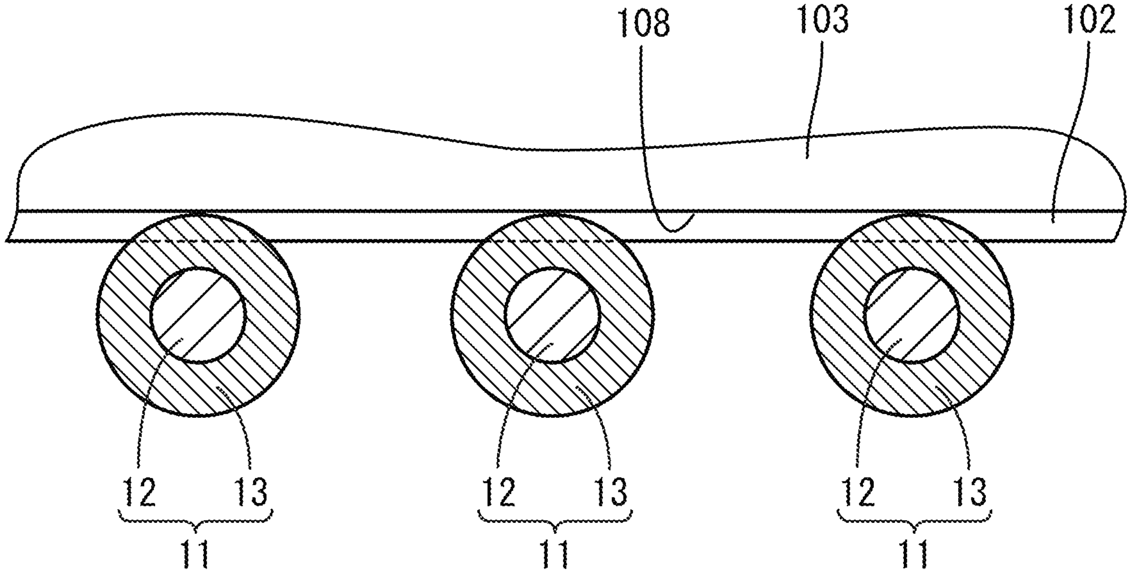
FIG. 11 is an enlarged cross-sectional view illustrating the portion of the wire pressing portion that presses the wire.

As illustrated in FIG. 11, the lower surface 108 of the upper cover member 103 is contacted with the electric wires 11 from the above when the upper cover member 103 and the lower cover member 104 are closed. Although details are not illustrated, the upper surface 109 of the lower cover member 104 is contacted with the electric wires 11 from the lower side. The distal end portion of the wire pressing portion 102 is not contacted with the core wires of the electric wires 11 when the wire pressing portion 102 is contacted with the electric wires 11.

Configurations other than the above-mentioned ones are similar to the configurations of the first embodiment. The components same as those of the first embodiment are indicated by the reference signs of the first embodiment and will not be described.

Figure 12:
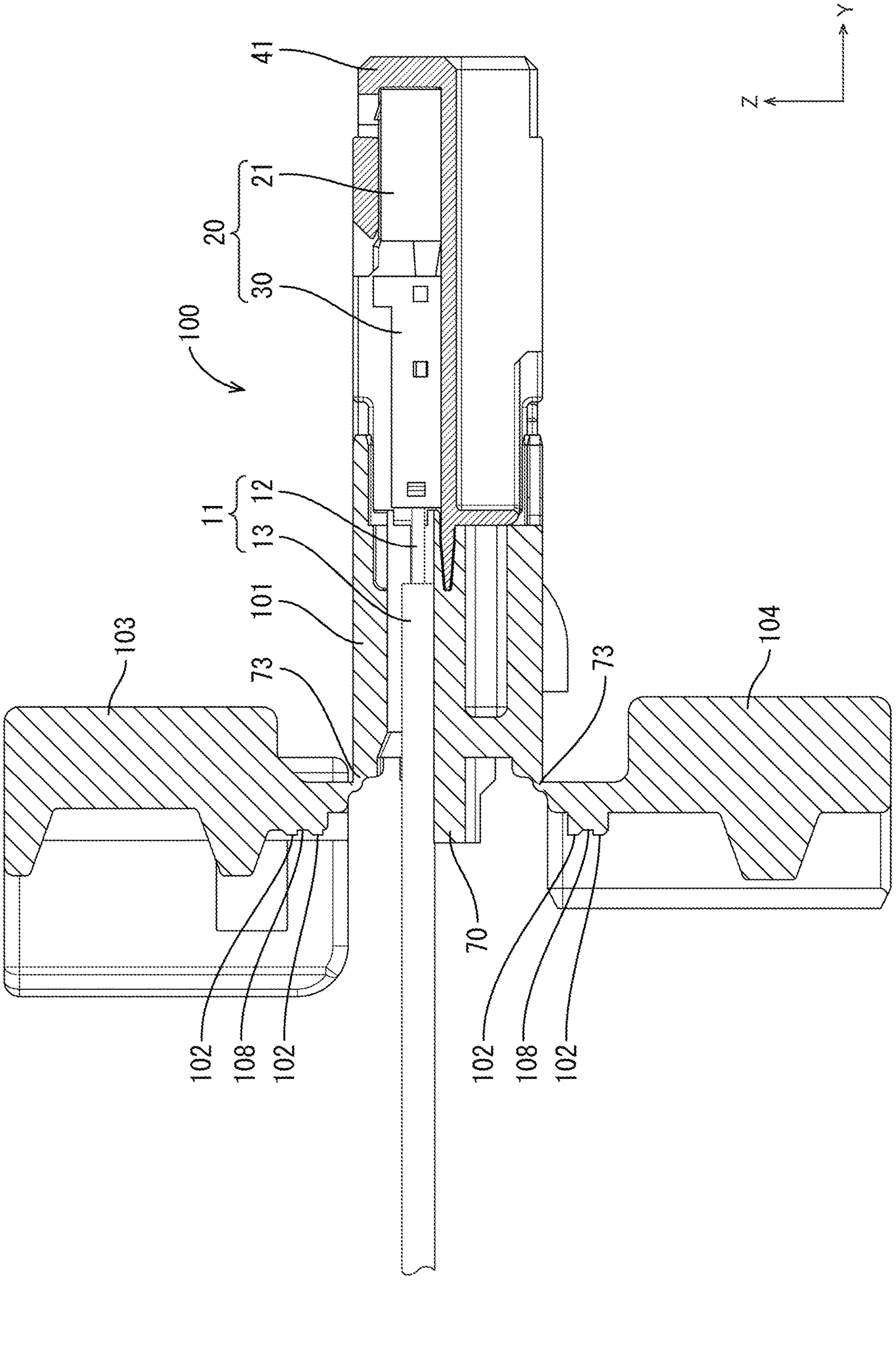
FIG. 12 is a cross-sectional view illustrating an upper cover member and a lower cover member that are away from a base portion.
Figure 13:
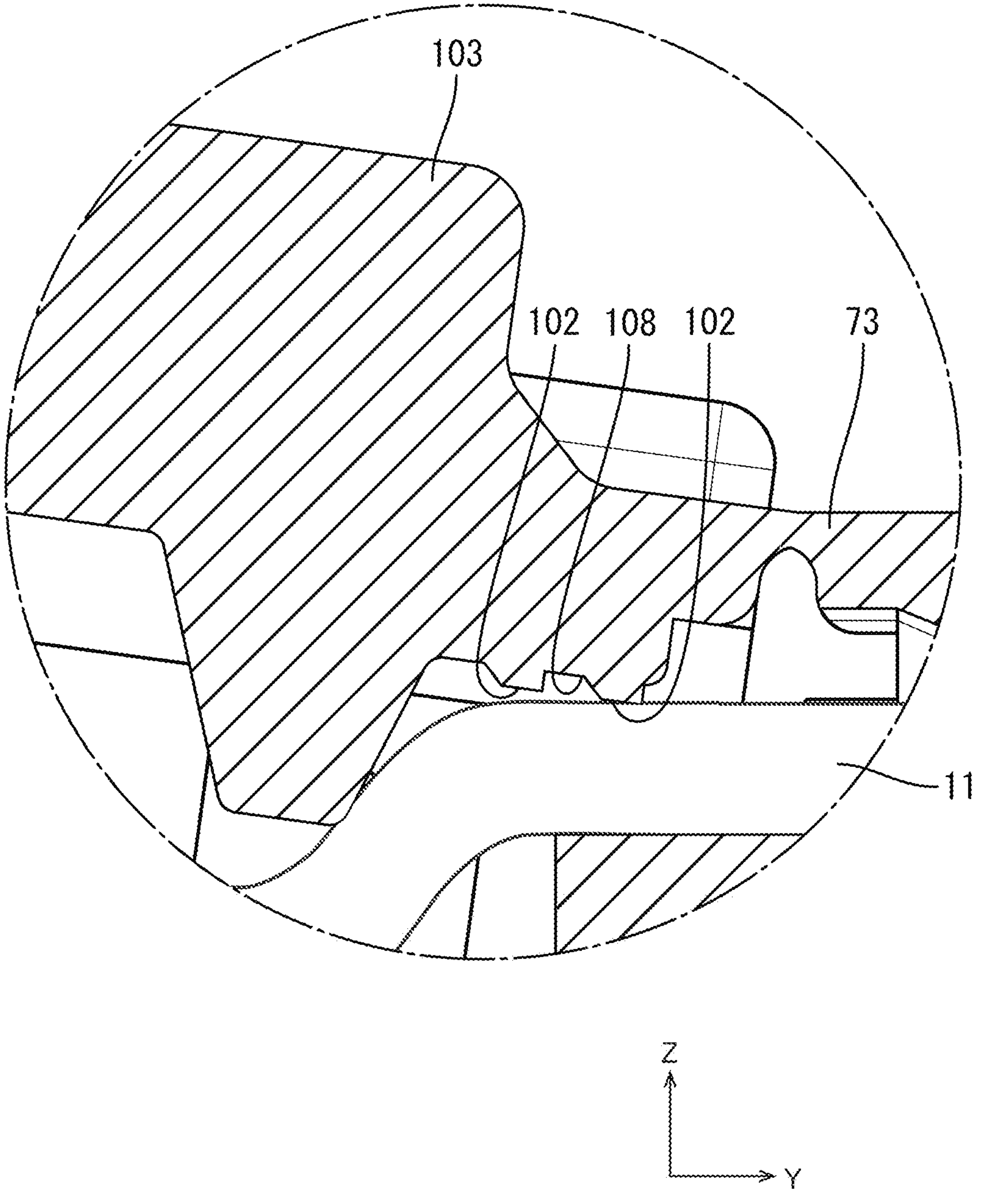
FIG. 13 is an enlarged cross-sectional view illustrating a portion of the wire pressing portion that is contacted with the wire.
Figure 14:
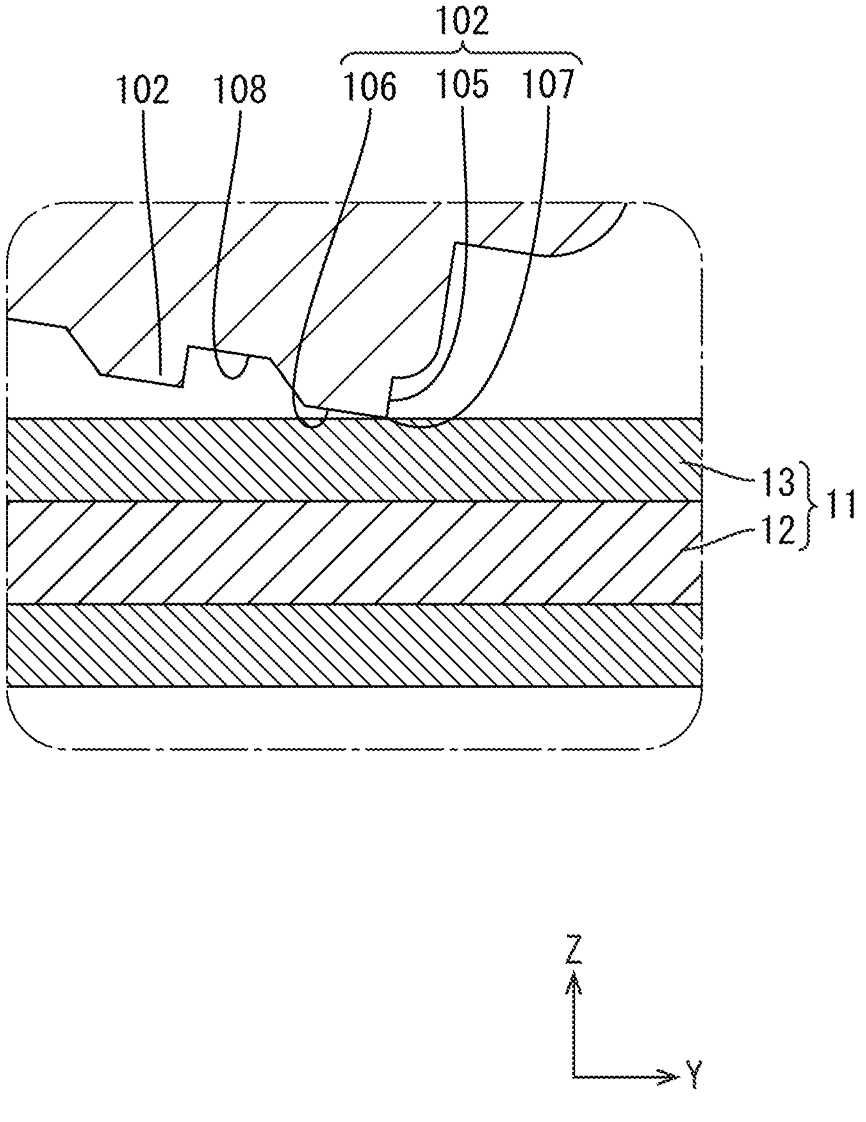
FIG. 14 is an enlarged cross-sectional view illustrating a portion of a contact portion that is contacted with the wire.

Next, operations and advantageous effects of this embodiment will be described. FIG. 12 illustrates the upper cover member 103 that is away from the electric wire 11. The upper cover member 103 is pivoted around the hinge 73, which is a rotation axis, to be closer to the base portion. Then, as illustrated in FIGS. 13 and 14, the contact portion 107 of the wire pressing portion 102 comes in contact with the insulating cover member of the electric wire 11 from the above. Since the contact portion 107 has an angled shape, the contact portion 107 of the wire pressing portion 102 is pressed into the insulating cover member 13 of the electric wire 11.

Figure 15:
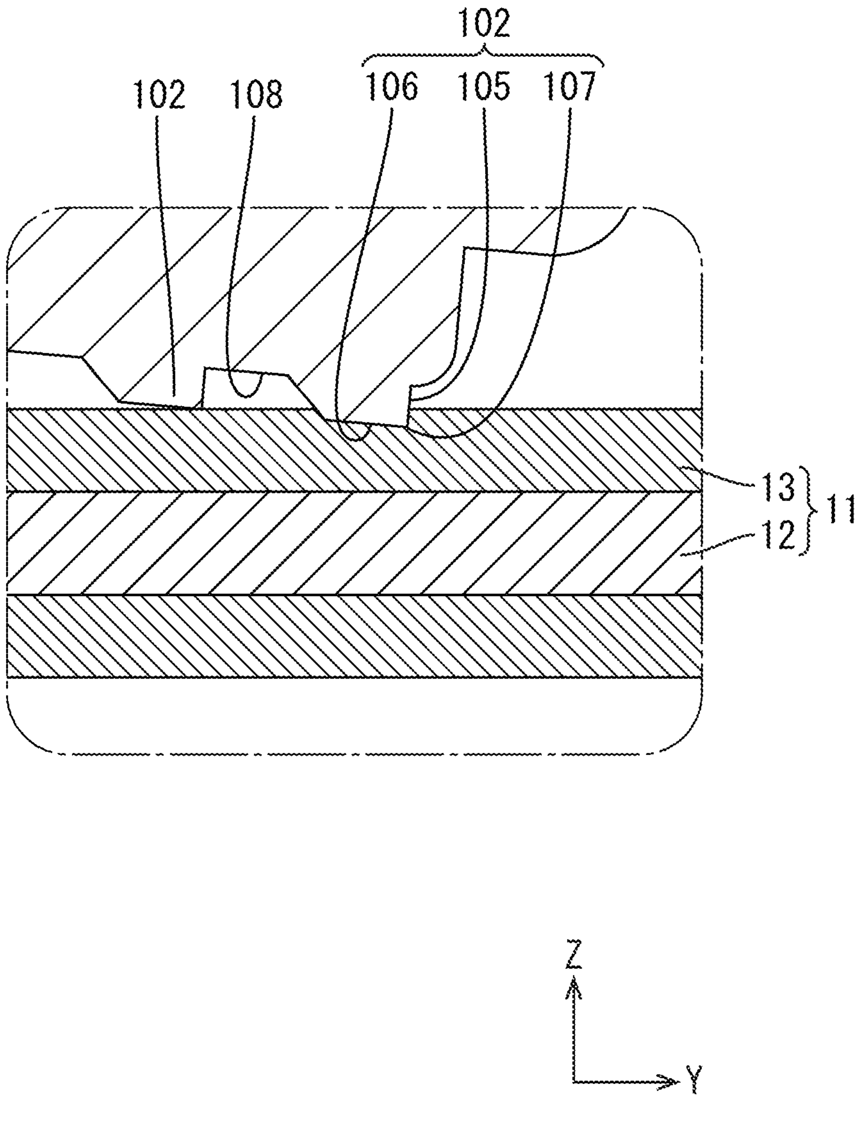
FIG. 15 is an enlarged cross-sectional view illustrating a portion of the wire pressing portion that is pressed into an insulating cover member of the wire.

According to the further pivoting of the upper cover member 103 around the hinge 73, which is the rotation axis, the top surface 106 of the wire pressing portion 102 is pressed into the insulating cover member 13 of the electric wire 11 as illustrated in FIG. 15.

As illustrated in FIG. 10, when the upper cover member 103 is fixed in a state in which the upper cover member 103 covers the base portion 70, the standing surface 105 of the wire pressing portion 102 is in a vertical state and the top surface 106 extends in the front-rear direction. According to such a configuration, if the electric wire 11 is pulled rearward, the standing surface 105 of the wire pressing portion 102 receives a force that is created when the electric wire 11 is pulled rearward.

In this embodiment, the upper cover member 103 and the lower cover member 104 can be pivotably moved from the position in which the cover members are away from the base portion 70 to the position in which the base portion 70 is covered with the cover members. The pressing portion 102 projects from each of the upper cover member 103 and the lower cover member 104. The contact portion 107 that has an angled shape first comes in contact with the electric wire 11 among the portions of the wire pressing portion 102 when the upper cover member 103 and the lower cover member 104 are pivoted and moved to the position in which the base portion 70 is covered.

Since the contact portion 107 has an angled shape, the wire pressing portion 102 is easily pressed into the electric wire 11 when the upper cover member 103 and the lower cover member 104 are pivoted and moved from the position in which the cover members are away from the base portion 70 to the position in which the base portion 70 is covered (when the upper cover member 103 and the lower cover member 104 are closed). This improves a holding force of holding the electric wires 11. Compared to a configuration including a round contact portion 107, the upper cover member 103 and the lower cover member 104 are closed easily and assembling properties of the connector 10 are improved.

In this embodiment, the wire pressing portions 102 of the upper cover member 103 and the lower cover member 104 include the standing surfaces 105 and the top surfaces 106. The standing surfaces 105 are plane surfaces and project from the upper cover member 103 and the lower cover member 104 and the top surfaces 106 are plane surfaces and extend from the ends of the standing surfaces 105 rearward in the extending direction of the electric wires 11. The contact portion 17 is the angled portion between the standing surface 105 and the top surface 106. The angle that is formed by the standing surface 105 and the top surface 106 is 90 degrees or smaller.

According to such a configuration, the contact portion 107 first comes in contact with the electric wire 11 when the upper cover member 103 and the lower cover member 104 are pivoted to be closed.

In this embodiment, the wire pressing portion 102 is tapered from a basal portion thereof that is close to the upper cover member 103 or the lower cover member 104 toward the top surface 106.

According to such a configuration, the wire pressing portion 102 is easily pressed into the electric wire 11.

In this embodiment, the basal portion of the wire pressing portion 102 is continuous from the lower surface 108 of the upper cover member 103 and the basal portion of the wire pressing portion 102 is continuous from the upper surface 109 of the lower cover member 104. The lower surface 108 of the upper cover member 103 and the upper surface 109 of the lower cover member 104 are contacted with the electric wires 11 when the upper cover member 103 and the lower cover member 104 cover the base portion 70.

Since the lower surface 108 of the upper cover member 103 and the upper surface 109 of the lower cover member 104 are contacted with the electric wires 11, the wire pressing portions 102 are less likely to be pressed into the electric wire 11 excessively. This suppresses the insulating cover member 13 of the electric wire 11 from being torn.

In this embodiment, each of the upper cover member 103 and the lower cover member 104 includes the wire pressing portions 102.

Since the wire pressing portions 102 are included, the holding force of holding the electric wires 11 can be further improved.

Fourth Embodiment

Figure 16:
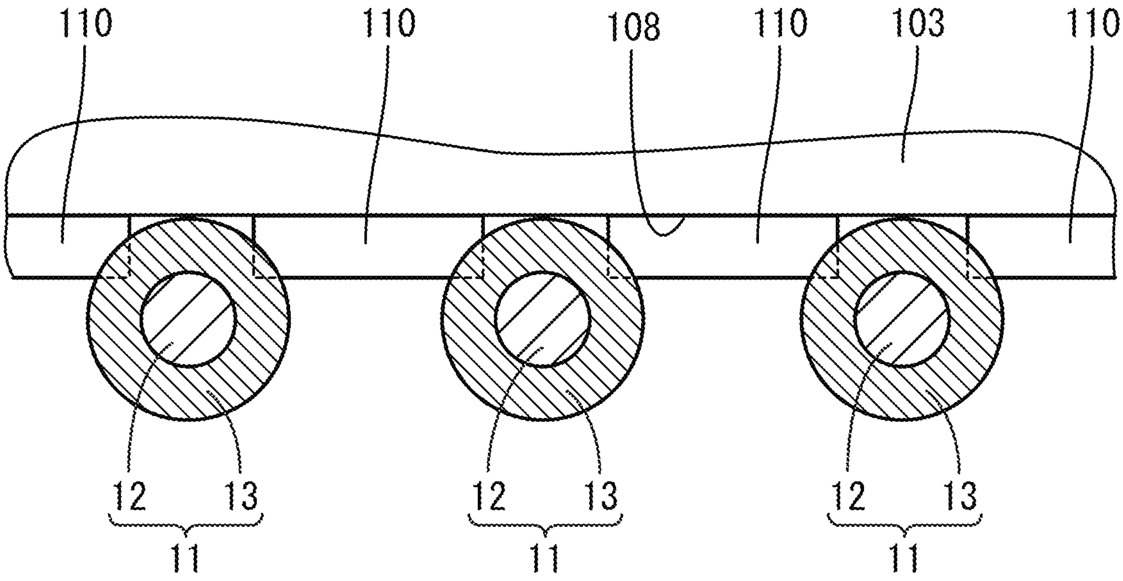
FIG. 16 is an enlarged rear view illustrating a portion of a wire pressing portion according to a fourth embodiment.

Next, wire pressing portions 110 according to a fourth embodiment of the present disclosure will be described with reference to FIG. 16. In this embodiment, the wire pressing portions 110 are arranged at intervals in the right-left direction. The interval between the wire pressing portions 110 that are adjacent to each other in the right-left direction is smaller than a diameter of the electric wire 11. According to such a configuration, two end portions of each wire pressing portion 110 in the right-left direction are pressed into the insulating cover member of the electric wire 11.

Configurations other than the above-mentioned ones are similar to the configurations of the third embodiment. The components same as those of the third embodiment are indicated by the reference signs of the third embodiment and will not be described.

Fifth Embodiment

Figure 17:
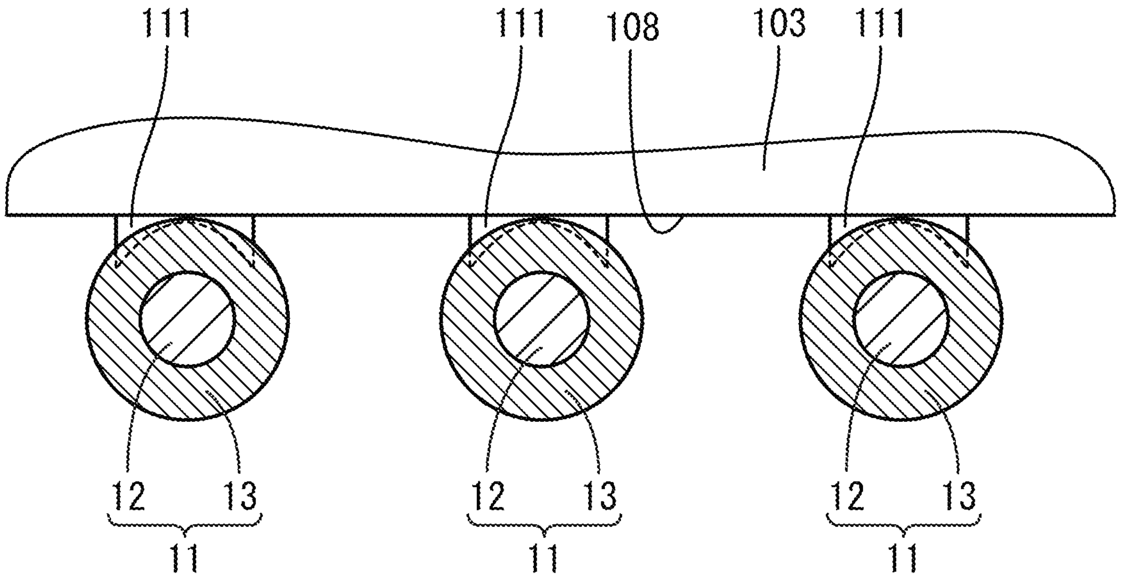
FIG. 17 is an enlarged rear view illustrating a portion of a wire pressing portion according to a fifth embodiment.

Next, wire pressing portions 111 according to a fifth embodiment of the present disclosure will be described with reference to FIG. 17. In this embodiment, the wire pressing portions 111 are arranged at intervals in the right-left direction. Each of the wire pressing portions 111 is arranged corresponding to each of the electric wires 11. The wire pressing portion 111 has a top surface 106 that has an arched shape seen from the front-rear direction.

Configurations other than the above-mentioned ones are similar to the configurations of the third embodiment. The components same as those of the third embodiment are indicated by the reference signs of the third embodiment and will not be described.

Sixth Embodiment

Figure 18:
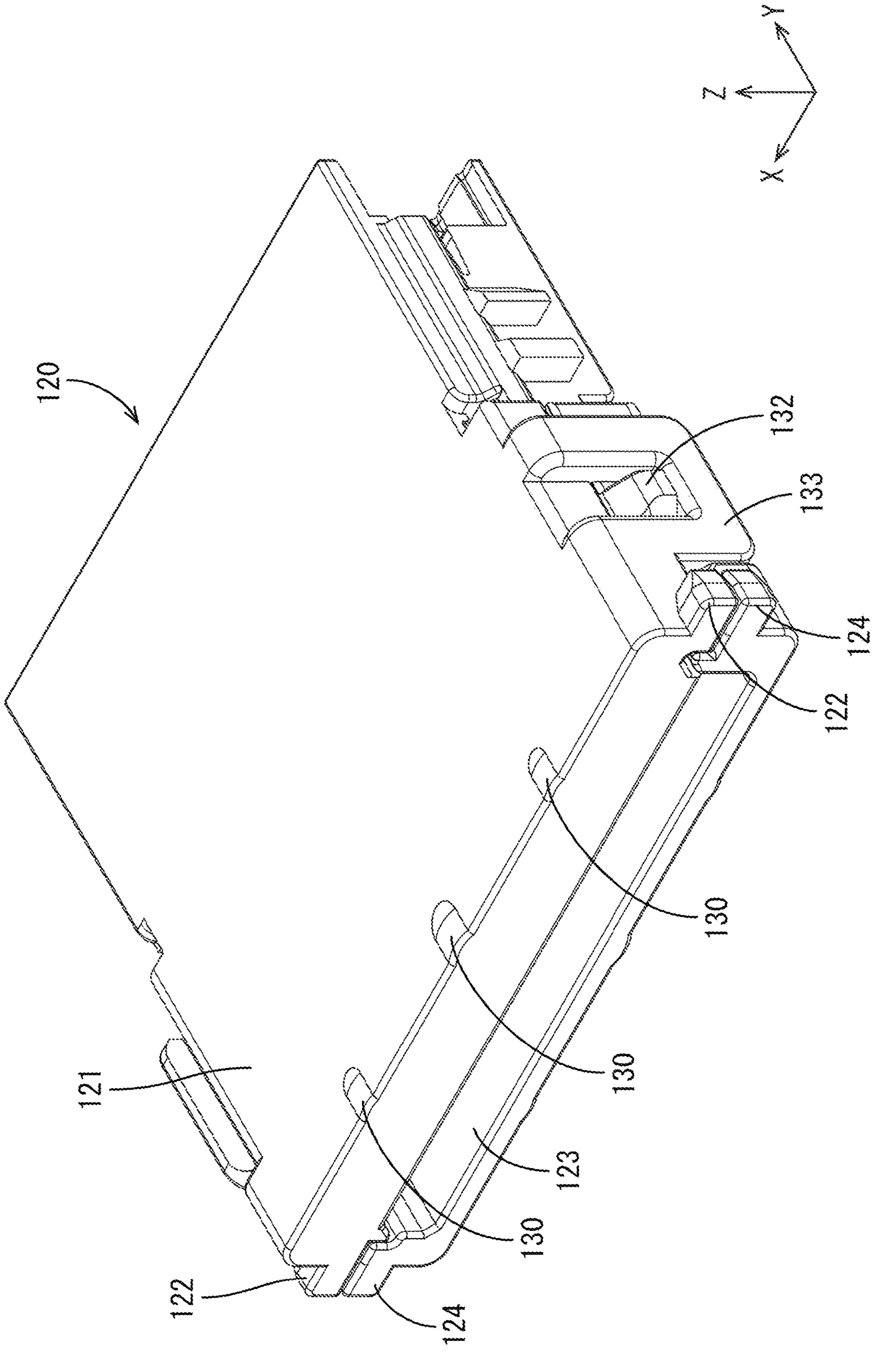
FIG. 18 is a perspective view illustrating a rear holder according to a sixth embodiment.
Figure 19:
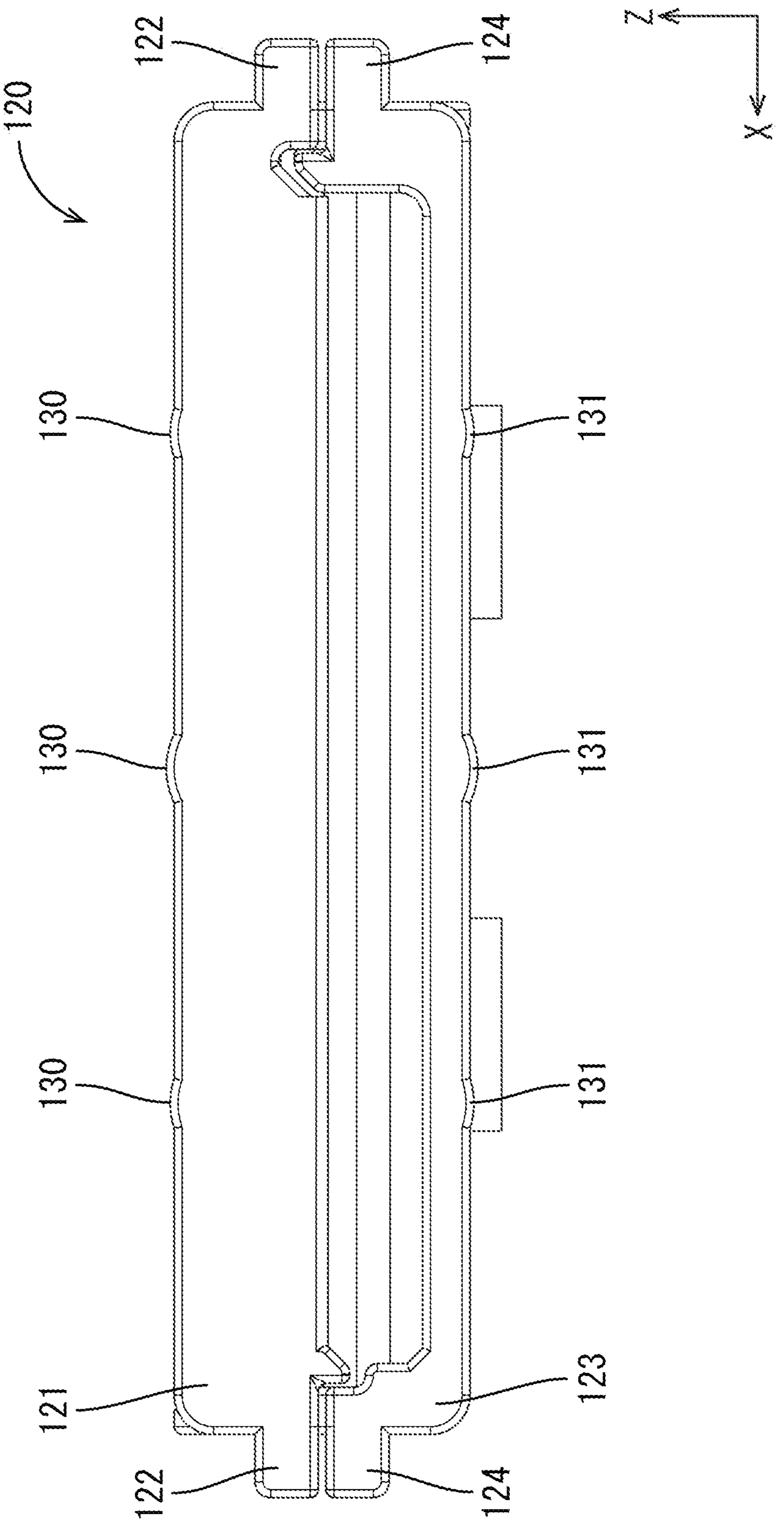
FIG. 19 is a rear view illustrating the rear holder.

Next, a connector 119 according to a sixth embodiment of the present disclosure will be described with reference to FIGS. 18 to 25. As illustrated in FIGS. 18 and 19, an upper cover member 121 of a rear holder 120 of this embodiment includes upper ribs 122 (one example of a rib) in a rear end portion thereof and the upper ribs 122 projects rightward and leftward, respectively. A lower cover member 123 of the rear holder 120 includes lower ribs 124 (one example of the rib) in a rear end portion thereof and the lower ribs 124 projects rightward and leftward, respectively. The rightward projection dimension and the leftward projection dimension of the upper ribs 122 and the lower ribs 124 are substantially equal.

Figure 20:
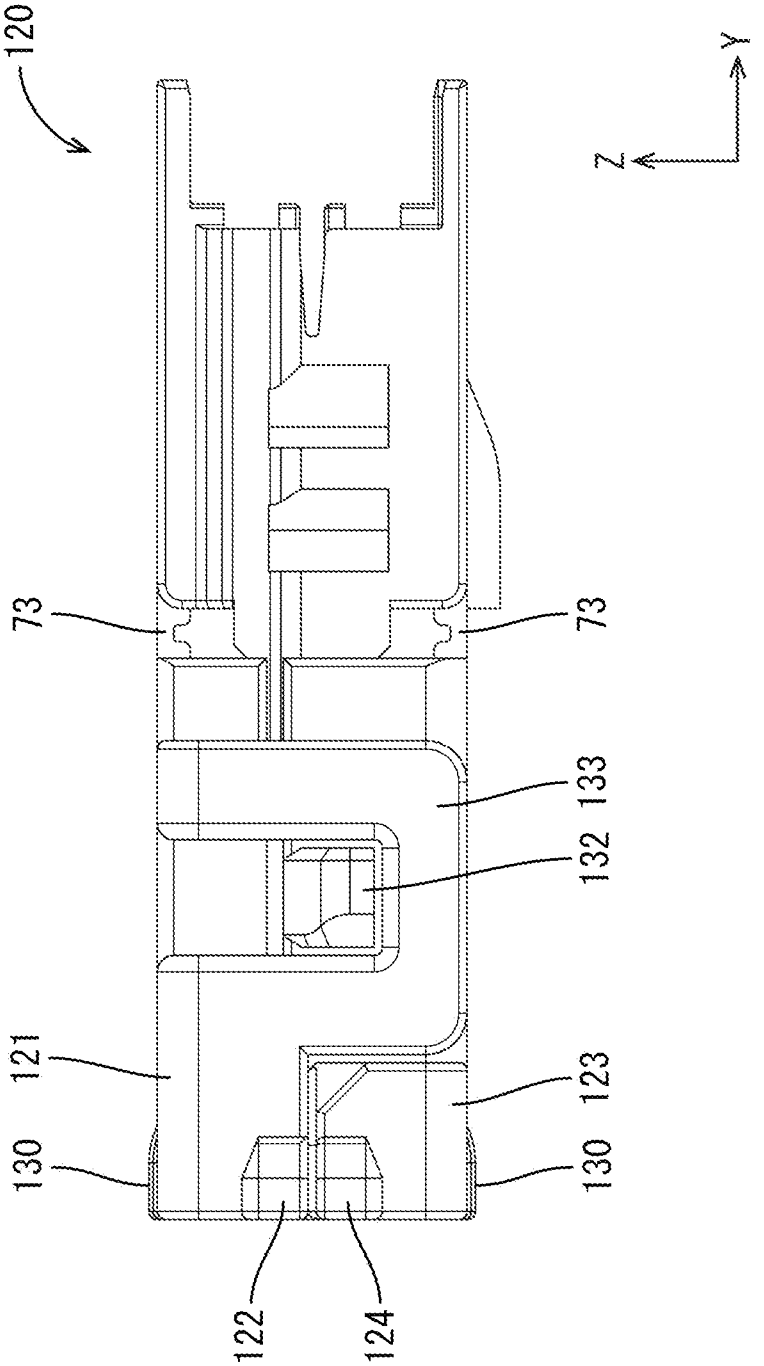
FIG. 20 is a side view illustrating the rear holder.

As illustrated in FIG. 20, the upper rib 122 and the lower rib 124 include front end portions that are tapered frontward. Thus, the upper rib 122 and the lower rib 124 are tapered to become thinner as they extend frontward.

Figure 21:
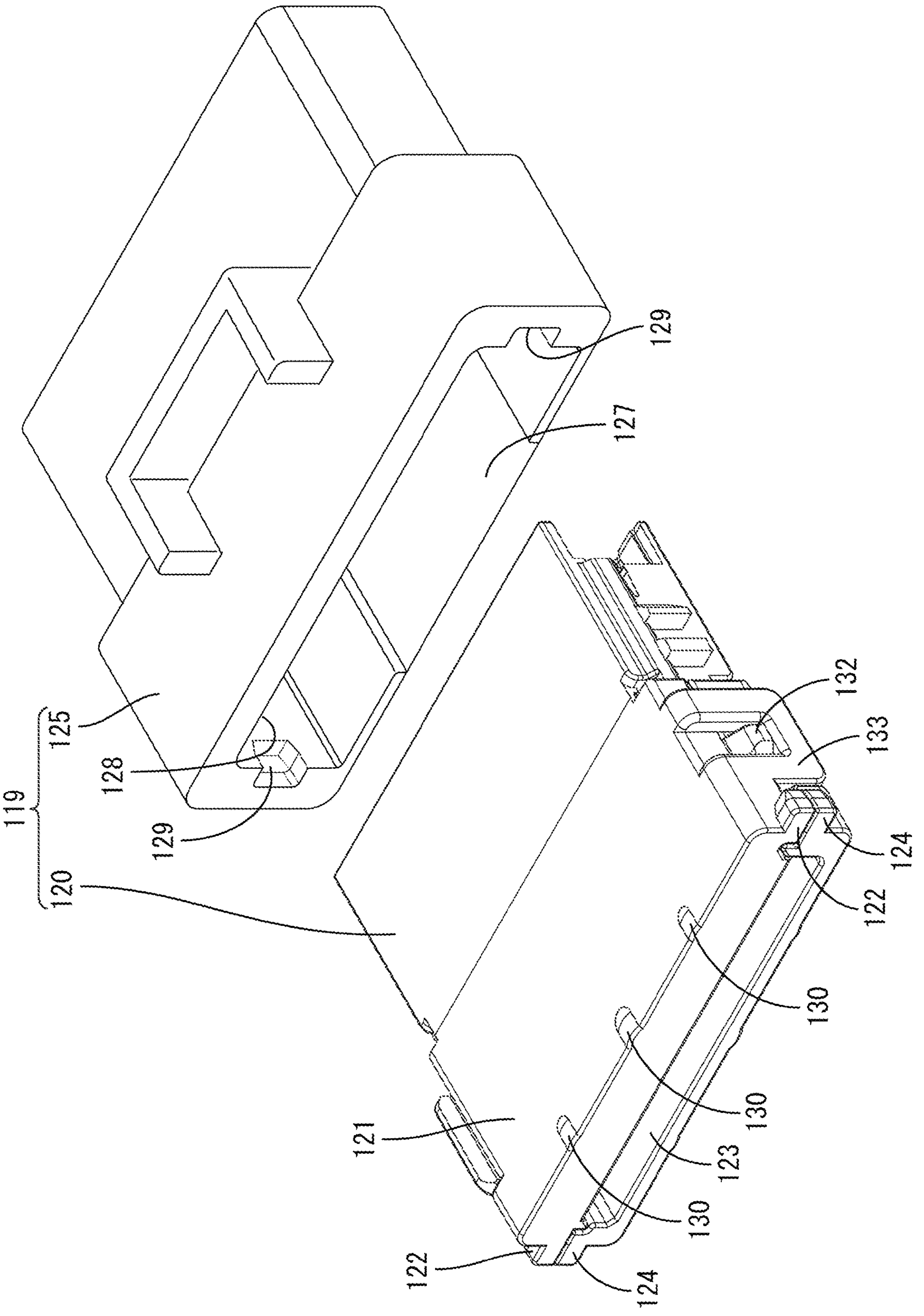
FIG. 21 is a perspective view illustrating the rear holder and an outer housing.
Figure 22:
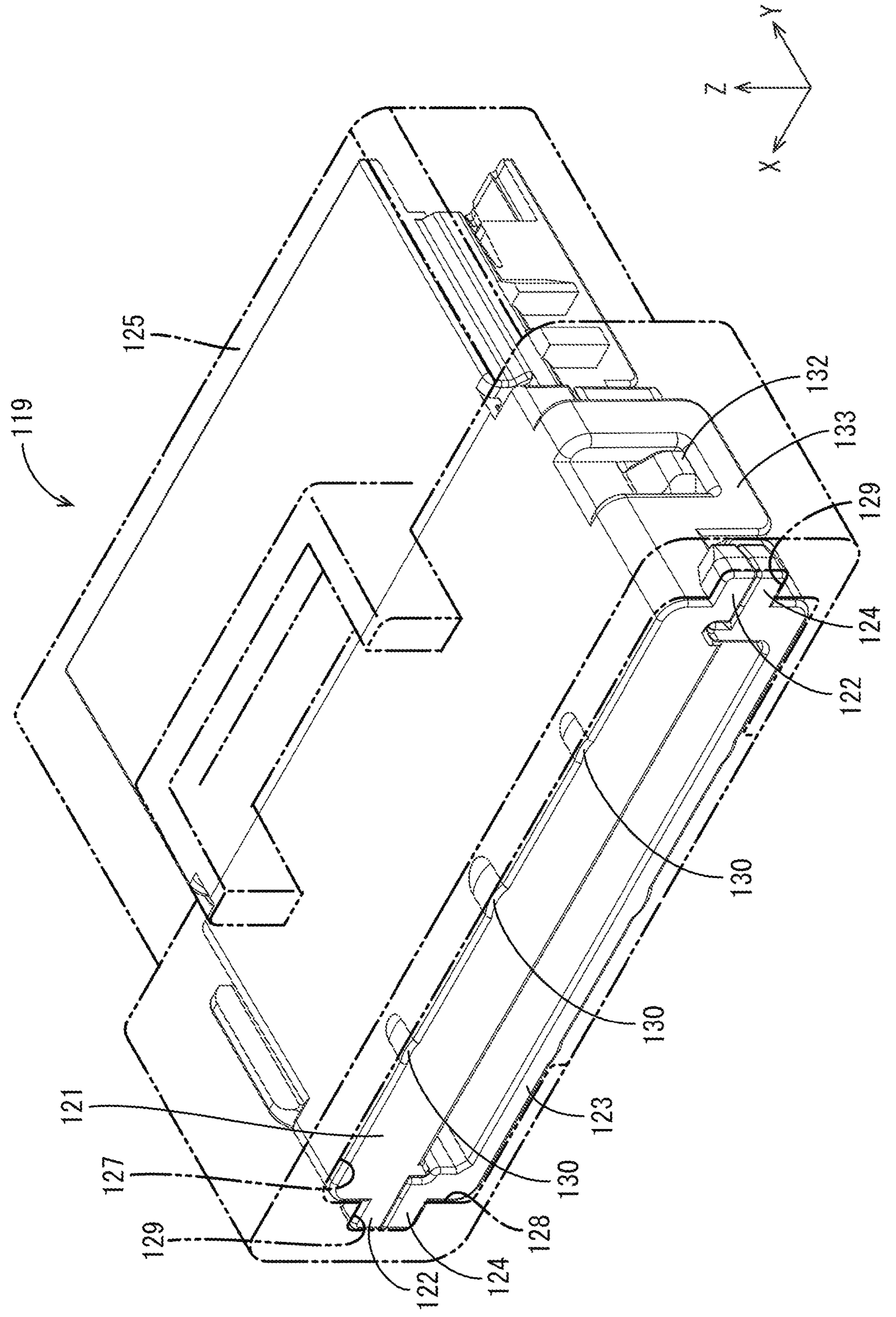
FIG. 22 is a perspective view illustrating the outer housing that receives the rear holder therein.

As illustrated in FIGS. 21 and 22, an outer housing 125 includes a receiver portion 127 in which a housing 126 is arranged. The receiver portion 127 has an opening 128 that opens rearward. The housing 126 is put in the receiver portion 127 through the opening 128 from the rear side.

The receiver portion 127 includes retainer portions 129 at right and left ends of an opening edge of the opening 128. The retainer portion 129 has a recessed shape recessed from a rear surface of the receiver portion 127 having the opening 128. The upper rib 122 and the lower rib 124 of the rear holder 120 are inserted in the retainer portion 129 from the rear side.

Figure 23:
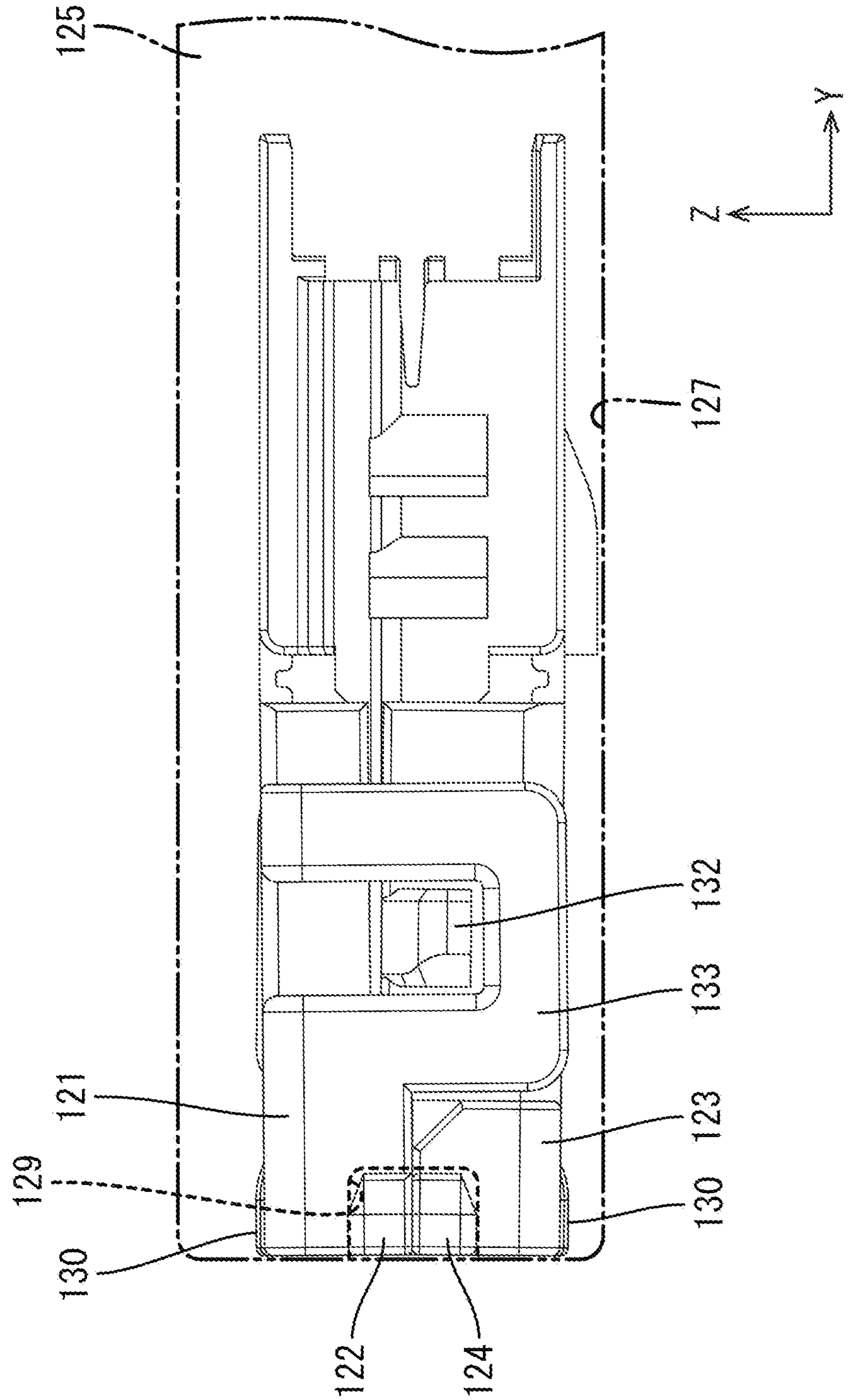
FIG. 23 is a side view illustrating the outer housing that receives the rear holder therein.

As illustrated in FIGS. 22 and 23, when the housing 126 is inserted in the receiver portion 127, the upper rib 122 and the lower rib 124 of the rear holder 120 are contacted with an inner surface of the retainer portion 129. Accordingly, the upper cover member 121 of the rear holder 120 is pressed downward and the lower cover member 123 of the rear holder 120 is pressed upward. As a result, the gap between the upper cover member 121 and the lower cover member 123 of the rear holder 120 becomes smaller than that before the housing 126 is put in the receiver portion 127.

As illustrated in FIG. 18, the upper cover member 121 includes upper projections 130 (one example of a projection) on an upper surface of the upper cover member 121. Three upper projections 130 are arranged at intervals in the right-left direction on the rear edge portion of the upper cover member 121 and project upward from the upper surface of the upper cover member 121. A middle one among the three upper projections 130 with respect to the right-left direction is slightly greater than other ones on the right side and the left side.

As illustrated in FIG. 19, the lower cover member 123 includes lower projections 131 (one example of the projection) on a lower surface of the lower cover member 123. Three lower projections 131 are arranged at intervals in the right-left direction on the rear edge portion of the lower cover member 123 and project downward from the lower surface of the lower cover member 123. A middle one among the three lower projections 131 with respect to the right-left direction is slightly greater than other ones on the right side and the left side.

As illustrated in FIGS. 21 and 22, the upper projections 130 are contacted with the lower surface of the upper cover member 121 and pressed downward. Accordingly, the upper cover member 121 is pressed downward toward the lower cover member 123. The lower projections 131 are contacted with the upper surface of the lower cover member 123 and pressed upward. Accordingly, the lower cover member 123 is pressed upward toward the upper cover member 121. As a result, the gap between the upper cover member 121 and the lower cover member 123 of the rear holder 120 becomes smaller than the gap between the cover members before the housing 126 is arranged in the receiver portion 127.

Configurations other than the above-mentioned ones are similar to the configurations of the first embodiment. The components same as those of the first embodiment are indicated by the reference signs of the first embodiment and will not be described.

Figure 24:
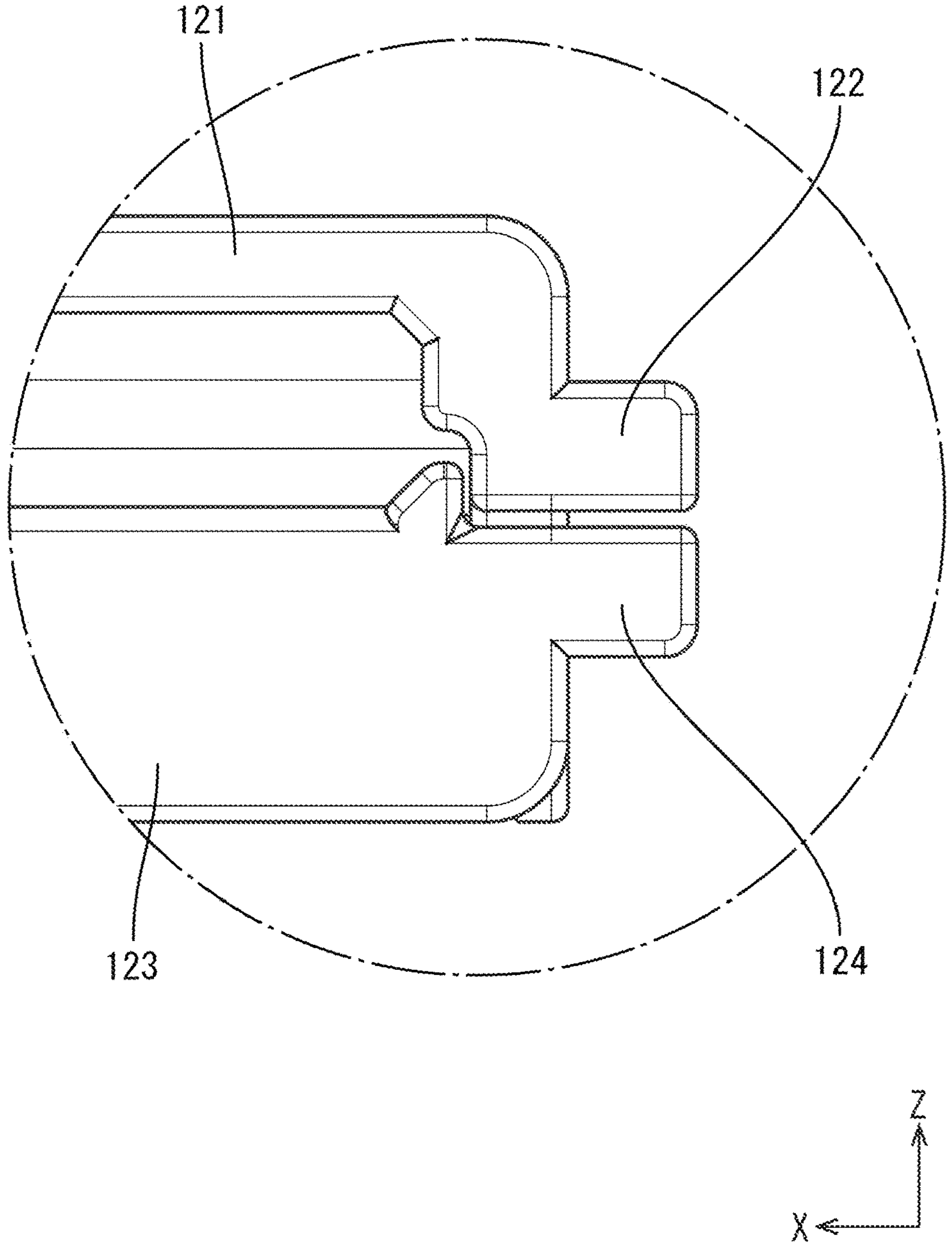
FIG. 24 is an enlarged rear view illustrating portions of the upper cover member and the lower cover member having a small gap therebetween.
Figure 25:
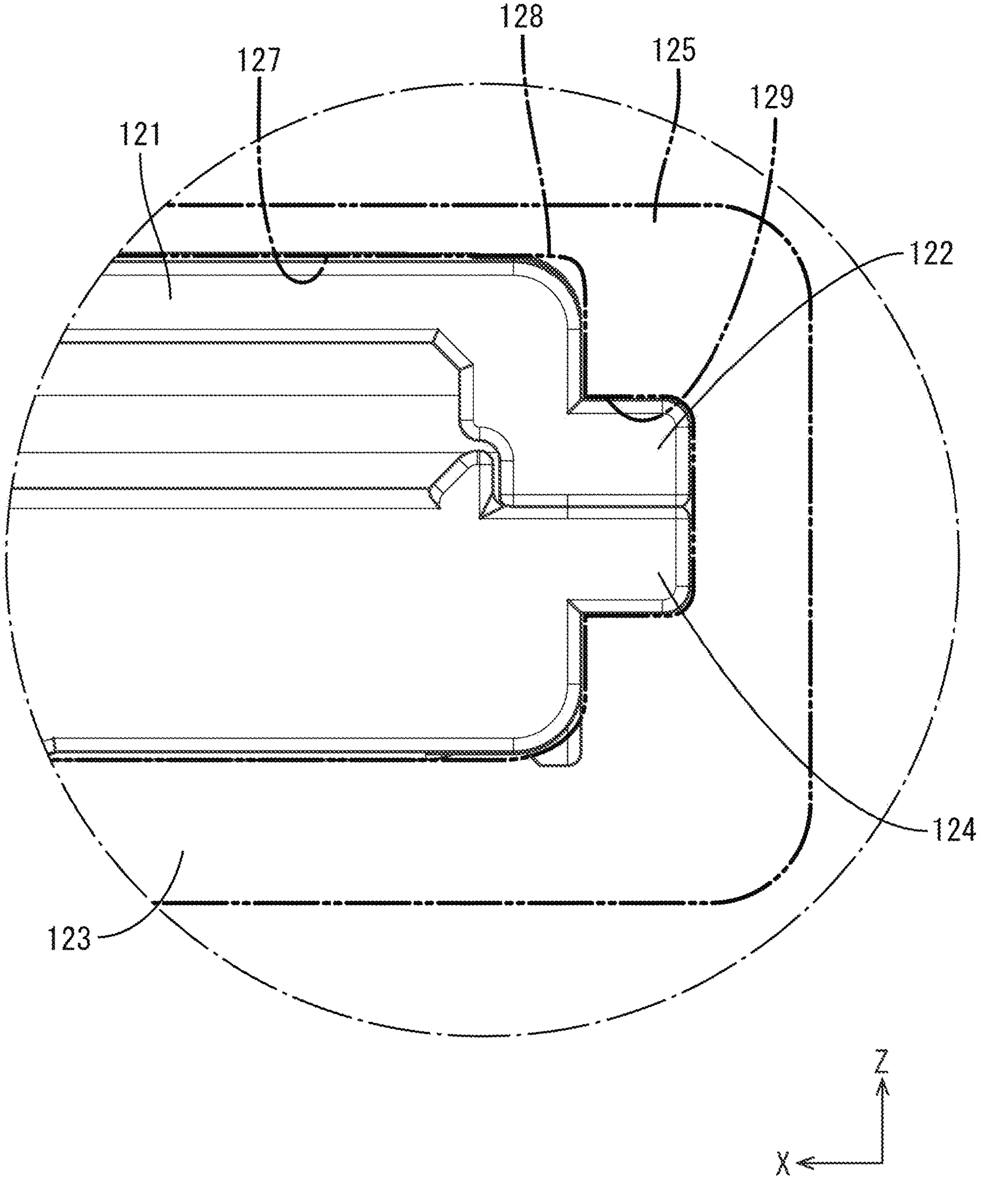
FIG. 25 is an enlarged rear view illustrating the portions of the upper cover member and the lower cover member in which rattling is suppressed.

Next, operations and advantageous effects of this embodiment will be described. As illustrated in FIG. 20, the upper cover member 121 and the lower cover member 123 of the rear holder 120 are closed by elastic fitting of a cover locking portion 132 and a cover locking receiver 133. A small gap is provided between the cover locking portion 132 and the cover locking receiver 133 such that the cover locking portion 132 and the cover locking receiver 133 can be elastically fitted together. The upper cover member 121 and the lower cover member 123 have manufacturing tolerance of a component and assembly tolerance. Therefore, as illustrated in FIGS. 20 and 24, when the cover locking portion 132 and the cover locking receiver 133 are elastically fitted together, a gap is between the upper cover member 121 and the lower cover member 123 and this may make the upper cover member 121 and the lower cover member 123 to rattle. The rattling may decrease the pressing force of the electric wire pressing portion that presses the electric wires 11 and the holding properties of the housing 126 that holds the electric wires 11 may be lowered.

With respect to the above-described matters, the connector 119 of this embodiment includes the outer housing 125 in which the housing 126 is arranged. The upper cover member 121 and the lower cover member 123 include the upper ribs 122 and the lower ribs 124 that project from the outer surfaces of the upper cover member 121 and the lower cover member 123, respectively. The outer housing 125 includes the retainer portions 129 that press the upper ribs 122 toward the lower cover member 123 and press the lower ribs 124 toward the upper cover member 121 when the housing 126 is arranged in the outer housing 125.

The upper ribs 122 are pressed toward the lower cover member 123 and the lower ribs 124 are pressed toward the upper cover member 121. This suppresses the rattling between the upper cover member 121 and the lower cover member 123 and the wire holding properties of the housing 126 can be improved (refer to FIGS. 23 and 25).

In this embodiment, the upper cover member 121 and the lower cover member 123 are fitted together by the cover locking portion 132 and the cover locking receiver 133 in a vertical direction that crosses the direction in which the electric wires 11 extend. The upper ribs 122 and the lower ribs 124 are on the two end portions of each of the upper cover member 121 and the lower cover member 123 with respect to the right-left direction that crosses the electric wire 11 extending direction and the upper-lower direction.

The upper ribs 122 and the lower ribs 124 that are on the end portions with respect to the right-left direction suppress the overlapping portions of the upper cover member 121 and the lower cover member 123 from being separated from each other unlike a configuration that the upper ribs 122 and the lower ribs 124 are on the end portions with respect to the upper-lower direction.

According to this embodiment, the outer housing 125 includes the receiver portion 127 having the opening 128 and opening rearward. The housing 126 is inserted in the receiver portion 127 through the opening 128. The retainer portion 129 has a recessed shape recessed from the rear surface of the opening edge of the opening 128. One of the cover members includes the rib on the rear end portion thereof. The rib is inserted in the retainer portion 129 from the rear side. The inner surface of the retainer portion 129 is contacted with the upper rib 122 from a direction toward the lower cover member 123 (from the upper side) and is contacted with the lower rib 124 from a direction toward the upper cover member 121 (from the lower side). Thus, the upper cover member 121 and the lower cover member 123 are pressed to be closer to each other.

The retainer portion 129 has a recessed shape recessed from the rear surface of the opening edge. The upper ribs 122 and the lower ribs 124 are on the rear portions of the upper cover member 121 and the lower cover member 123, respectively. Therefore, the upper ribs 122 and the lower ribs 124 are not pressed by the retainer portions 129 while the housing 126 is being inserted into the outer housing 125. Accordingly, the operability of inserting the housing 126 into the outer housing 125 can be improved compared to a configuration that the upper ribs 122 and the lower ribs 124 are on front portions of the upper cover member 121 and the lower cover member 123, respectively.

In this embodiment, the front-side portions of the upper ribs 122 and the lower ribs 124 are tapered frontward.

The front-side portions of the upper ribs 122 and the lower ribs 124 that are tapered can guide the housing 126 when the housing 126 is inserted into the receiver portion 127 of the outer housing 125.

According to this embodiment, the upper cover member 121 and the lower cover member 123 include the upper projections 130 and the lower projections 131 that project from the outer surfaces of the upper cover member 121 and the lower cover member 123, respectively. The upper projections 130 and the lower projections 131 are contacted with the inner surface of the receiving portion 127.

Since the upper projections 130 and the lower projections 131 are contacted with the inner surface of the receiver portion 127, the upper cover member 121 and the lower cover member 123 are less likely to be curved.

Other Embodiments

The technology disclosed herein is not limited to the embodiments described above and illustrated in the drawings. For example, the following embodiments will be included in the technical scope of the technology described in the present disclosure.

(1) In the first embodiment and the second embodiment, the housing 41 is equipped with the rear holder 60, 91; however, the housing 41 may not be equipped with the rear holder.

(2) The electric wires may be crimped with a barrel to be connected to the terminals.

(3) The terminal may include one holding portion or three or more holding portions.

Figure 26:
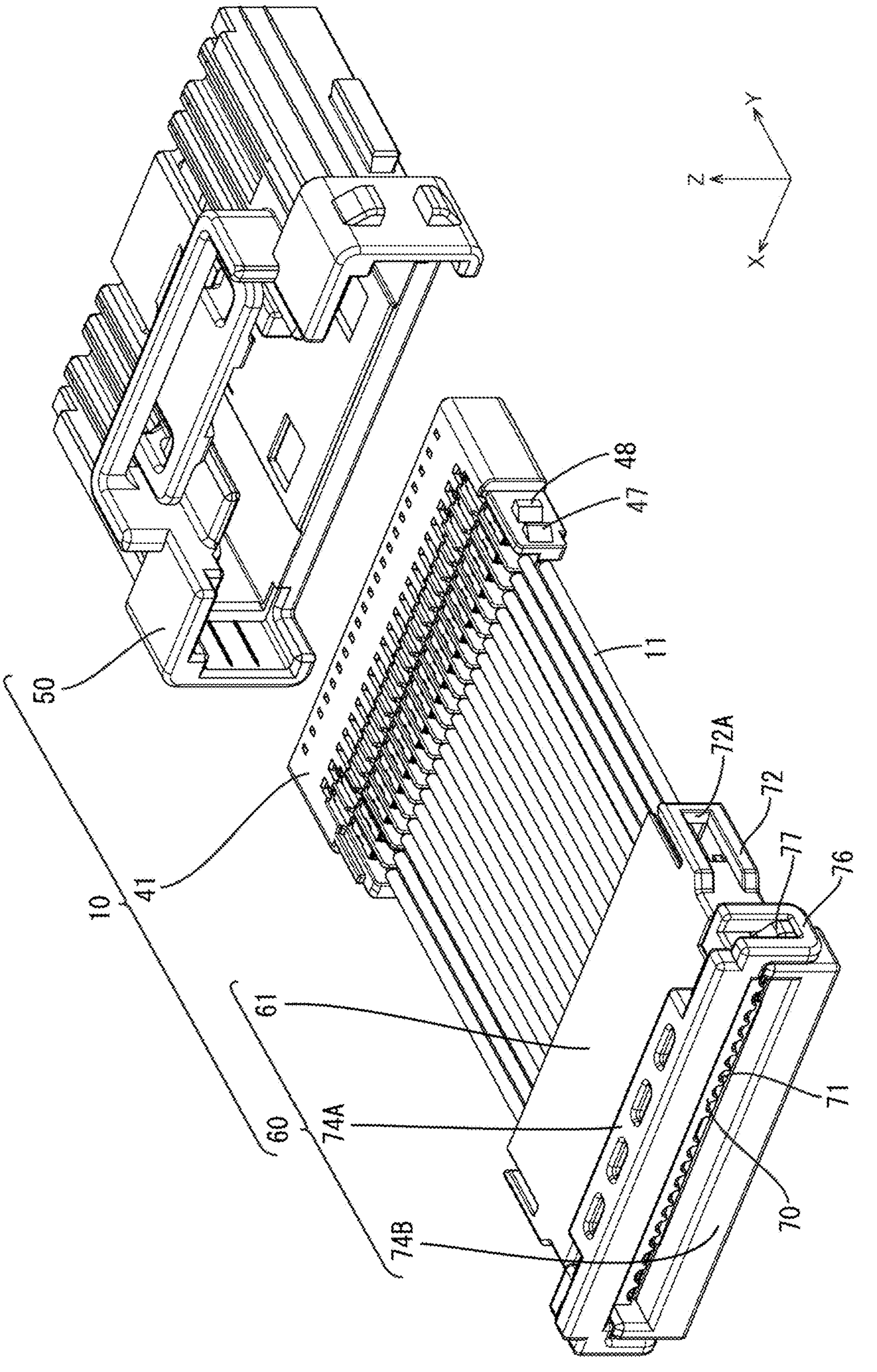
FIG. 26 is an exploded perspective view illustrating a connector according to other embodiment (4).

(4) As illustrated in FIG. 26, the stopper member and the stopper receiver of the first embodiment may not be included.

(5) The arrangement of the wire pressing portions, the strain relief portion 92, the auxiliary projections 93A, 93B, and the grooves 98 with respect to the front-rear direction in the rear holder 91 is not limited to the arrangement described in the second embodiment and the arrangement thereof in the front-rear direction may be altered as appropriate.

(6) The stopper member 78 may not be in the middle portion with respect to the right-left direction. Two or more stopper members 78 may be included.

(7) One cover member or three or more cover members may be mounted on the housing.

(8) The number of the upper projections 130 and the number of the lower projections 131 may be one, two, four or more.

EXPLANATION OF SYMBOLS

10, 90, 100, 119: connector
11: electric wire
12: core wire
13: insulting cover member
20: terminal
23: elastic contact piece
24: wire connection portion
26A: upper holding portion
26B: lower holding portion
30: shell
31A: upper pressing portion
31B: lower pressing portion
41, 126: housing
42: cavity
47: provisional stopper
48: stopper
50, 125: outer housing
51: square tubular member
60, 91, 101, 120: rear holder
61: body member
62: terminal stopper portion
70: base portion
71: wire routing groove
72: fitting frame
72A: fitting hole
73: hinge
74A, 94A, 103, 121: upper cover member
74B, 94B, 104, 123: loser cover member
75, 102, 110, 111: wire pressing portion
76, 132: cover locking portion
77, 133: cover locking receiver
78: stopper member
79: stopper projection
80: stopper receiver
92: strain relief portion
93A: upper auxiliary projection
93B: lower auxiliary projection
95: holding member
96: band member
97: stopper
98: groove
99: wire outlet
105: standing surface
106: top surface
107: contact portion

108: lower surface
109: upper surface
122: upper rib
124: lower rib
127: receiver portion
128: opening
129: retainer portion
130: upper projection
131: lower projection

The invention claimed is:

1. A connector comprising:

a terminal connected to a front end portion of an electric wire;

a housing in which the terminal is housed;

a base portion on which the electric wire extending rearward from a portion of the housing that has the terminal therein is disposed; and a cover member that is adjacent to the base portion and movable between a first position in which the cover member covers the base portion and a second position in which the cover member is away from and covers the base portion, the cover member having a facing surface that is opposite the base portion when the cover member is in the first position and including a wire pressing portion on the facing surface, the wire pressing portion pressing the electric wire disposed on the base portion toward the base portion when the cover member is in the first position, wherein the cover member includes at least two cover members that are disposed to sandwich the base portion and the at least two cover members include a first cover member and a second cover member.

2. The connector according to claim 1, further comprising an outer housing that receives the housing and covers the cover member from an outer side.

3. The connector according to claim 1, wherein the terminal includes a holding portion that holds the electric wire and a shell that is fitted to the holding portion such that the holding portion is within the shell, and the shell includes a pressing portion that presses the holding portion toward the electric wire.

4. The connector according to claim 1, wherein the first cover member includes a stopper member that projects toward the second cover member, and the stopper member is fitted to the second cover member when the first cover member and the second cover member are in the first position.

5. The connector according to claim 4, further comprising an outer housing that receives the housing, wherein one of the first cover member and the second cover member includes a rib that projects from an outer surface of the one of the first cover member and the second cover member, and the outer housing includes a retainer portion that is contacted with and presses the rib toward another one of the first cover member and the second cover member.

6. The connector according to claim 5, wherein the first cover member and the second cover member are fitted together in an upper-lower direction that crosses a direction in which the electric wire extends, and the rib is on a side portion of the one of the first cover member and the second cover member with respect to a right-left direction that crosses the direction in which the electric wire extends and the upper-lower direction.

7. The connector according to claim 6, wherein the outer housing includes a receiver portion that has an opening portion opening rearward and in which the housing is inserted through the opening portion, the opening portion is on a rear surface of the outer housing, the retainer portion is a recess that is recessed from the rear surface at an opening edge of the opening portion, the rib is on a rear portion of the one of the first cover member and the second cover member and is arranged in the retainer portion, and an inner surface of the retainer portion is contacted with the rib in a direction toward the other one of the first cover member and the second cover member such that the one of the first cover member and the second cover member is pressed toward the other one of the first cover member and the second cover member.

8. The connector according to claim 7, wherein the first cover member or the second cover member includes a projection that projects from an outer surface of a corresponding cover member and is contacted with an inner surface of the receiver portion.

9. A connector comprising:

a terminal connected to a front end portion of an electric wire;

a housing in which the terminal is housed;

a base portion on which the electric wire extending rearward from a portion of the housing that has the terminal therein is disposed; and a cover member that is adjacent to the base portion and movable between a first position in which the cover member covers the base portion and a second position in which the cover member is away from and covers the base portion, the cover member having a facing surface that is opposite the base portion when the cover member is in the first position and including a wire pressing portion on the facing surface, the wire pressing portion pressing the electric wire disposed on the base portion toward the base portion when the cover member is in the first position, according to claim 1, wherein the housing includes a strain relief portion that holds the electric wire to be curved with respect to a direction crossing a front-rear direction, and the strain relief portion is on a rear side with respect to the wire pressing portion.

10. A connector comprising:

a terminal connected to a front end portion of an electric wire;

a housing in which the terminal is housed;

a base portion on which the electric wire extending rearward from a portion of the housing that has the terminal therein is disposed;

a cover member that is adjacent to the base portion and movable between a first position in which the cover member covers the base portion and a second position in which the cover member is away from and covers the base portion, the cover member having a facing surface that is opposite the base portion when the cover member is in the first position and including a wire pressing portion on the facing surface, the wire pressing portion pressing the electric wire disposed on the base portion toward the base portion when the cover member is in the first position; and a holding member that is wrapped around the housing, the holding member being wrapped around a portion of the housing that is on a rear side with respect to the wire pressing portion while the electric wire being held between the cover member and the base portion.

11. The connector according to claim 10, wherein the cover member includes an auxiliary projection in a portion thereof around which the holding member is wrapped, the auxiliary projection projects toward the electric wire.

12. The connector according to claim 1, wherein the wire pressing portion projects from the facing surface of the cover member and includes a contact portion having an angled shape, and the contact portion first comes in contact with the electric wire when the cover member is moved from the second position to the first position.

13. The connector according to claim 12, wherein the wire pressing portion includes a standing surface that is a plane surface and extends from the facing surface of the cover member and a top surface that is a plane surface and extends from a distal end of the standing surface rearward in the extending direction in which the wire extends, the contact portion is an angled portion between the standing surface and the top surface, and an angle formed by the standing surface and the top surface is 90 degrees or smaller.

* * * * *